US009674290B1

(12) United States Patent
Rincon et al.

(10) Patent No.: US 9,674,290 B1
(45) Date of Patent: Jun. 6, 2017

(54) PLATFORM FOR ENABLING REMOTE SERVICES

(71) Applicant: uZoom, Inc., Seattle, WA (US)

(72) Inventors: Martin Rincon, Seattle, WA (US); Gregory Harrison, Seattle, WA (US); Dean Graziano, Seattle, WA (US); Leonard Leung, Seattle, WA (US)

(73) Assignee: uZoom, Inc., Seattle, WA (US)

( * ) Notice: Subject to any disclaimer, the term of this patent is extended or adjusted under 35 U.S.C. 154(b) by 0 days.

(21) Appl. No.: 15/365,884

(22) Filed: Nov. 30, 2016

Related U.S. Application Data

(60) Provisional application No. 62/261,010, filed on Nov. 30, 2015, provisional application No. 62/312,263, filed on Mar. 23, 2016, provisional application No. 62/369,710, filed on Aug. 1, 2016.

(51) Int. Cl.
  *H04L 29/08* (2006.01)
  *H04L 29/06* (2006.01)
  *H04L 12/18* (2006.01)

(52) U.S. Cl.
  CPC .......... *H04L 67/18* (2013.01); *H04L 12/1818* (2013.01); *H04L 67/10* (2013.01); *H04L 67/38* (2013.01)

(58) Field of Classification Search
  None
  See application file for complete search history.

(56) References Cited

U.S. PATENT DOCUMENTS

| | | | | |
|---|---|---|---|---|
| 9,049,259 | B2 * | 6/2015 | Rathod | H04N 21/44222 |
| 9,092,928 | B2 * | 7/2015 | Cohen | G07F 17/26 |
| 2005/0132420 | A1 * | 6/2005 | Howard | G06F 3/017 |
| | | | | 725/135 |
| 2007/0028749 | A1 * | 2/2007 | Basson | G10H 1/0091 |
| | | | | 84/601 |
| 2008/0027984 | A1 * | 1/2008 | Perdomo | G06Q 10/107 |
| 2009/0023555 | A1 * | 1/2009 | Raymond | G06Q 10/10 |
| | | | | 482/9 |
| 2009/0115965 | A1 * | 5/2009 | Waldorf | A61B 3/113 |
| | | | | 351/210 |
| 2009/0115966 | A1 * | 5/2009 | Waldorf | A61B 3/112 |
| | | | | 351/210 |

(Continued)

*Primary Examiner* — Ninos Donabed
(74) *Attorney, Agent, or Firm* — John W. Branch; Lowe Graham Jones PLLC

(57) ABSTRACT

A platform receives service requests from a principal. The service request includes a service location that is remote from the principal. A communication session between the principal and an agent that is near the service location is provided. The agent is available to perform the service, which may include remote videography services, tutorial services, or personal shopping services, over the communication session. The principal generates gesture data to direct the agent when performing the service. A visual representation of the gesture data is provided to the agent so that the agent may follow the principal's direction. The gesture data may be blended and/or overlaid image data captured by an image sensor employed by the agent. The principal may provide financial resources to the agent to enable the agent to perform the service and/or compensate the agent for their performance. The principal is enabled to provide metrics for the agent's performance.

24 Claims, 18 Drawing Sheets

(56) References Cited

U.S. PATENT DOCUMENTS

| | | | |
|---|---|---|---|
| 2009/0210080 A1* | 8/2009 | Basson | G10H 1/0091 700/94 |
| 2009/0320123 A1* | 12/2009 | Yu | G06F 21/316 726/16 |
| 2012/0223882 A1* | 9/2012 | Galor | G06F 3/011 345/157 |
| 2013/0219278 A1* | 8/2013 | Rosenberg | G06F 3/017 715/733 |
| 2013/0219288 A1* | 8/2013 | Rosenberg | H04M 3/54 715/748 |
| 2013/0283208 A1* | 10/2013 | Bychkov | G06F 3/017 715/810 |
| 2013/0283213 A1* | 10/2013 | Guendelman | G06F 3/017 715/848 |
| 2013/0296057 A1* | 11/2013 | Gagner | G06F 3/017 463/37 |
| 2014/0068014 A1* | 3/2014 | Vonog | H04L 67/2823 709/219 |
| 2014/0078135 A1* | 3/2014 | Ka Yan | G06T 15/10 345/419 |
| 2014/0129942 A1* | 5/2014 | Rathod | H04N 21/44222 715/720 |
| 2014/0184772 A1* | 7/2014 | Hanina | G06F 19/3456 348/77 |
| 2014/0344922 A1* | 11/2014 | Lam | G06F 21/629 726/19 |
| 2015/0015671 A1* | 1/2015 | Kellerman | G06F 3/012 348/46 |
| 2015/0077430 A1* | 3/2015 | Conroy | G06T 7/0012 345/589 |
| 2016/0012376 A1* | 1/2016 | Rainisto | G06Q 10/109 705/7.15 |
| 2016/0037055 A1* | 2/2016 | Waddington | H04N 5/23206 348/211.8 |
| 2016/0127641 A1* | 5/2016 | Gove | G06T 1/0007 348/143 |
| 2016/0173578 A1* | 6/2016 | Sharma | H04L 67/1002 709/203 |
| 2016/0188109 A1* | 6/2016 | Wang | G06F 3/011 345/173 |

* cited by examiner

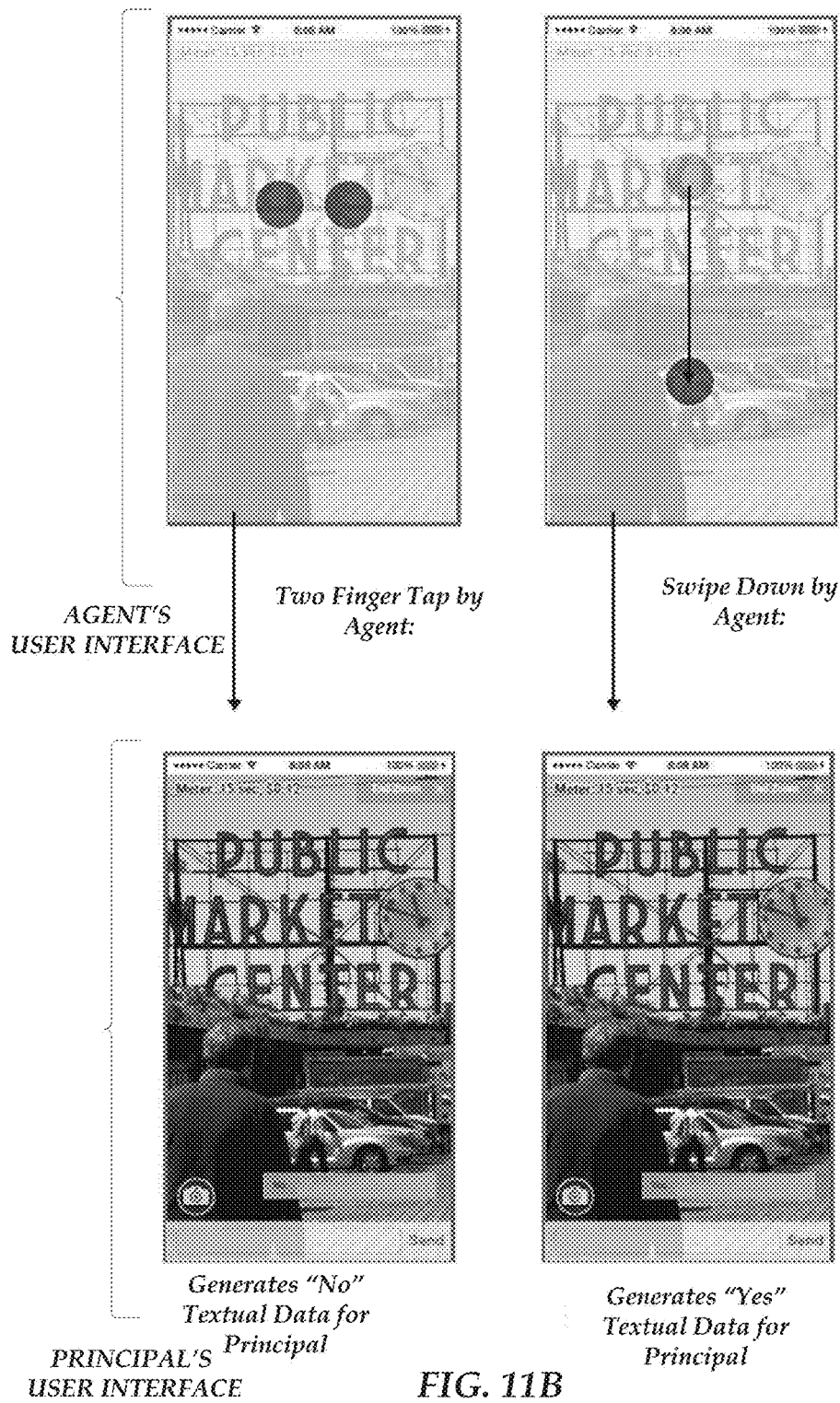

US 9,674,290 B1

PLATFORM FOR ENABLING REMOTE SERVICES

PRIORITY CLAIMS

This application is a utility patent application based on a previously files U.S. Provisional Patent Application U.S. Ser. No. 62/261,010, filed on Nov. 30, 2015, the benefit of the filing date of which is hereby claimed under 35 U.S.C. §119(e) and which is further incorporated by reference in its entirety. This Utility Patent application is further based on a previously filed U.S. Provisional Patent Application U.S. Ser. No. 62/312,263 filed on Mar. 23, 2016, the benefit of the filing date of which is hereby claimed under 35 U.S.C. §119(e) and which is further incorporated by reference in its entirety. This Utility Patent application is further based on a previously filed U.S. Provisional Patent Application U.S. Ser. No. 62/369,710 filed on Aug. 1, 2016, the benefit of the filing date of which is hereby claimed under 35 U.S.C. §119(e) and which is further incorporated by reference in its entirety.

TECHNICAL FIELD OF THE INVENTION

The disclosure relates generally to remote services and more specifically, but not exclusively to enabling the performance of requested services at a remote location.

BACKGROUND OF THE INVENTION

Mobile devices that include geo-location services are ubiquitous. Such mobile-devices are often equipped with high-quality video-capture and display devices. When connected via one or more communication networks, such mobile devices enable users to participate in real-time video-based communication sessions. It is for these and other reasons that the following disclosure is provided.

BRIEF DESCRIPTION OF THE DRAWINGS

FIG. 11B shows embodiments of gesture to textual data;

DETAILED DESCRIPTION OF THE PREFERRED EMBODIMENT

Figure 1:
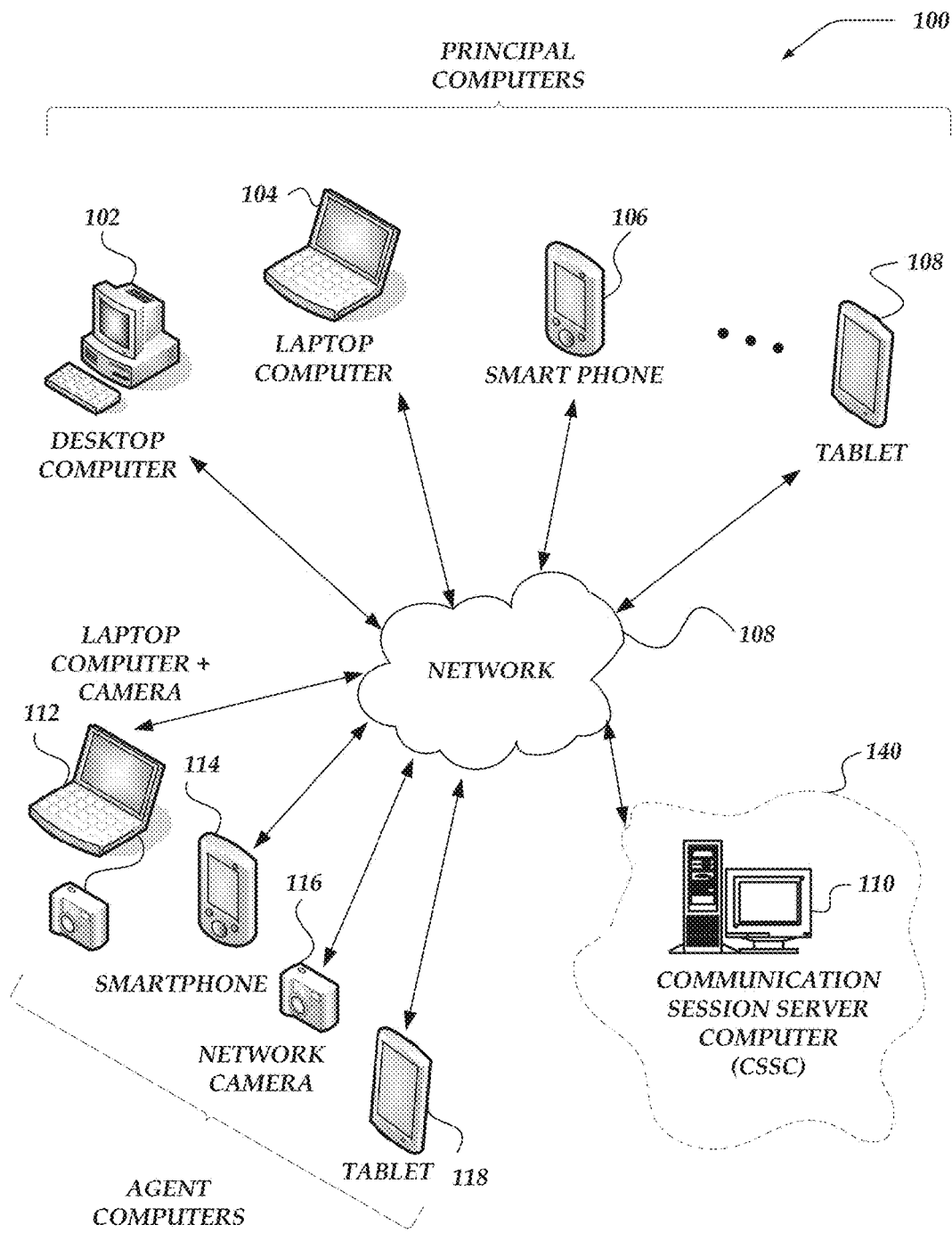
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein the term, "engine" refers to logic embodied in hardware or software instructions, which can be written in a programming language, such as C, C++, Objective-C, COBOL, JAVA™, PHP, Perl, HTML, CSS, JavaScript, Ruby, VBScript, ASPX, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in a non-transitory computer-readable media or a computer storage device, and may be stored on and executed by one or more processors for a general purpose computer, thus creating a special purpose computer configured to provide the engine.

Briefly stated, embodiments are directed to various methods, systems, applications, modules, engines, platforms, and the like that enable on-demand remote services in real time. In the various embodiments, a user (a principal user, or simply a principal) may request services to be performed, at least partially, in real time at a remote location. The various embodiments may determine one or more other users (an agent user, or simply an agent) that may be located at least near the remote location. The one or more determined agents may be available and enabled to provide at least a portion of the real time requested services. In some embodiments, each of the principal and agent may be users of a networked computers, such as but not limited to a mobile computer. As discussed below, such networked computers may be enabled to provide and receive communication data, such as but not limited to textual, audio, and image data, including video data.

One or more of the available agents may be selected to provide the remote services for the principal. In some embodiments, a principal may request an availability of a particular agent. In other embodiments, a principal may be somewhat agnostic as to the particular agent that performs the requested services. In such embodiments, the principal may request the service to be performed by any available agent. A plurality of available agents may be provided to the principal to manually select. In at least one embodiment, an available agent may be automatically selected for the principal.

A communication session may be established that enables the selected agent to at least partially provide the remote service to the principal. During a communication session, each of the principal and agent may capture, generate, provide, transmit, receive, communicate, or otherwise exchange communication session (CS) data. The CS data may be communicated, to at least one of the principal or agent in real-time, or at least near real-time, via the communication session. Such CS data includes, but is not otherwise limited to image (still and/or video) data, audio data, textual data, graphical data, gesture data, and the like. As discussed throughout, CS data may include various metadata, such as but not limited to gesture data. In some embodiments, gesture data may include locational, positional, attitudinal, and/or orientation data. At least a portion of the CS data may be captured generated, provided, transmitted, received, communicated, and/or exchanged by employing the one or more networked computers employed by each of the principal and agent. At least portions of the CS data, such as but not limited to locational, positional, attitudinal, and orientation data, may be captured by sensors employed by either Principals or Agents. Such sensors may be embedded in a augmented reality (AR) and/or a virtual reality (VR) headsets, gloves, glasses, or other such devices that may track locational, positional, attitudinal, or orientation type gestures. In at least one embodiment, the eye movement and/or focus of at least one of the Principal and/or Agent may be sensed to generate such gesture data.

In various embodiments, via at least one of gesture, textual, audio, and/or video/image data, a principal is enabled to interactively direct the actions of the remote user (the agent), via the real-time or near-real time communication session. In one non-limiting embodiment, at least a portion of gesture data (provided to the agent) may be generated by the principal tapping, tapping and holding, pinching, reverse-pinching, pulling, and otherwise interacting with a touch-sensitive display employed by the principal. In various embodiments, a differentiation between single and double finger taps generate separate gesture data. In at least one embodiment, the agent may be enabled to similarly provide gesture data to the principal.

In one or more embodiments, but non-limiting, the requested services may include remote videography services. As such, the agent may capture video data (via one or more image sensors includes in a computer employed by the agent) and provide the video data, in real-time or near real-time, to the principal via the communication session. Furthermore, when the image data is being captured by the agent and viewed and/or reviewed by the principal, the communication session may enable the principal to at least partially direct the agent, in real time. In one or more embodiments, but non-limiting, such direction may be enabled via at least gesture data.

As described herein, such gesture data may be generated and/or generated by the principal employing a user interface (UI) on a computing device that enables the principal to participate in the communication session. In one or more of the various embodiments, the Principal user's UI is employed to translate the Principal's physical gestures into gesture data that is transmitted in a gesture protocol over a chat message sub-channel of a streaming service protocol which includes a primary channel that is used to communicate images such as pictures and/or video over the communication session. The chat message sub-channel is typically employed to communicate text messages between the Agent and the Principal user for display on their corresponding computing devices. However, the various embodiments repurpose the chat message sub-channel to also communicate non-displayable alphanumeric data, such as gesture data and session control data, that is logically processed by separate engines for the Principal user and Agent user. An agent user may be provided with a similar UI to participate in the communication session, that also enables the agent to receive the Principal's gesture data and separately generate and/or capture Agent gesture data for physical gestures and/or audio commands of the agent that may be transmitted to the Principal's computing device. Such gesture data may be blended, overlaid, or otherwise combined with the other CS data (such as but not limited to the textual, audio, and image data), and provided to the agent in real-time via the communication data. Such a combining of the Principal's gesture data with the other provided CS data, such as image, text and audio data, is employed to provide the agent with visual, audible, graphical, and/or textual cues as to the performance of the requested services. As discussed throughout, such cues may include cues that provide physical and/or tactile cues on computing devices employed by the Agent and/or Principal. For instance, user interfaces, such as but not limited to tactile and/or haptic interfaces may be employed by at least one of the users, such that the user is provided one or more cues that includes vibration or other physical movement. Such interfaces may be included in wearable devices, such as but not limited to AR and/or VR headsets, gloves, glasses, and the like. Additionally, bi-directional audio communication, such as instructions from the principal user or comments from the agent user, may be provided over the communication session between the principal user and the agent user. In at least one embodiment, the audio communication can be provided in another channel of the image capture service.

Such gesture data may include graphical and/or visual data to direct the agent in the performance of the services. For instance, the gesture data may be employed to indicate a point of interest for the agent to focus on. Visual renderings and/or representations of such gesture data may provide a visual cue to direct at least the direction or relative speed of the agent's movement when performing the services. Such gesture data may also include visual cues for the agent to zoom in/zoom out, with respect to the videography services. Such gesture data may be graphically displayed via overlaying and/or blending with the image data, such as the transmitted and received video data on each of the principal's and the agents display devices. In addition to graphical overlays or graphical blends, gesture data may include audio, attitudinal, orientation and/or textual data to provide further and/or additional indications, instructions, and the like for the agent's performance. Such textual data may be additionally overlaid and/or blended with the image data.

For example, a principal user may request on-demand image capture services such as videography and/or picture services to remotely inspect real and/or physical property, such as but not limited a rental property. At least one or more available agents, within the vicinity of the rental property, are determined and selected to provide the videography services. As the selected agent captures and provides image data to the principal, the principal may direct, via gesture data, the agent to focus capturing image data that include specific regions or items within the rental property. As discussed above, such gesture data may include graphical data overlaid or blended with the image data displayed on each of the principal's and agent's display device to provide visual cues for directing the videography services.

Similarly, an agent user may be requested to provide image data regarding an event, such as but not limited to a sporting or musical event. In some embodiments, the agent's performance may require the agent to provide financial currency, such as but not limited to paying for entrance to an event or destination, purchasing transportation (such as bus or taxi fare), and the like.

At least some embodiments enable at least the principal to provide and/or transfer resources, such as financial resources or financial currency, to the agent. In at least one embodiment, the agent is enabled to similarly provide resources to the principal. For instance, a principal may be enabled to provide the agent with financial resources such that the agent may purchase an item, access an event that requires a fee, or the like, via the communication session. In some embodiments, the principal may be enabled to provide a credit, attribution, financial payment and/or a donation for the agent's performance, electronically via the communication sessions.

Various embodiments may be enabled by one or more applications included in the principal's and agent's computers. Such applications may include, or at least interact with one or more communication engines. For instance, in one or more non-limiting embodiments, a mobile application installed on each of the principal's and agent's mobile computers may provide at least some of the features of the various embodiments discussed herein. As discussed throughout, other embodiments may include non-mobile computers and/or non-mobile applications.

In some embodiments, the image sensors employed to capture image data may include a field of view (FOV) that is greater than typical 2D image sensors. For instance, a image sensor may include an omnidirectional or 360-degree FOV camera. Accordingly, an agent may provide immersive and/or spherical image data to a principal in the various embodiments. In such embodiments, a principal may employ a display device that is enabled to display the omnidirectional image device to provide an immersive experience to the principal. For instance, the principal may employ a virtual reality (VR) and/or AR-like headset, gloves, and the like during the communication session. As discussed throughout, such wearable sensors and user interfaces enable the capturing and providing of gesture cues, such as but not limited to attitudinal, orientational, and other such cues.

In some embodiments, at least one of the principal or agent may employ one or more devices that provide tactile sensory functionality, as well as tactile stimuli to the user. For instance, the principal and agent may each employ a wearable device that provide enable the principal to generate tactile-based gesture data to direct the agent. Such tactile-based gesture data may be provided to the agent, and the agent's wearable may provide tactile feedback to guide the agent in their performance of the requested services. For instance, touch sensations provided to the agent may guide directional movements of the agent.

In various embodiments, at least one of the principal or the agent may employ one or more sensors, such as but not limited to may include accelerometers, gyroscopes, temperature sensors, barometric sensors, light sensors, biometric sensors, such as heartrate monitors, and the like. At least a portion of these sensors may be wearable. Such wearable devices may include but are not otherwise limited to a pedometer, a smartwatch, headwear, glasses, and the like. Data generated and/or captured by these sensors may be included in the CS data. Thus, each of the principal and agent may be provided sensor data generated and/or captured by the other party's sensors in real time, or near real-time.

Thus, the principal may employ one or more gesture sensors that includes one or more wearable sensors to generate one or more gesture signals based on a movement of the principal. The gesture signals may be provided to one or more haptic interfaces employed by the agent. The haptic interface may provide tactile feedback to the agent that indicates the movement of the principal.

In some embodiments, augmented reality (AR) data may be included in the CS data stream. Such AR data may be overlaid and/or blended with the image data to identify specific POIs or particular items within the FOV. AR data may be used to indicate particular information, such a cost of an item, distance to another location, or the like. At least a portion of the AR data may be captures and/or generated by one or more of the sensors, such as wearable sensors.

In some embodiments, the camera and/or audio device employed to capture and/or generate image and/or audio data may be included in a vehicle, such as but not limited to an automobile, aerial drone, or the like. In at least one embodiment, the agent may not be a human actor. For instance, the agent may include one or more of a robotic systems, an autonomous systems, a remote controlled system, or the like. For instance, the agent may be an aerial drone that provides videography services, from the air, to the principal. The principal may remotely control both the movement and the image data capturing functionality of the drone, via gesture data. In at least one embodiment, the agent may include an autonomous or somewhat autonomous vehicle. Such an agent may provide a delivery service for the principal, at least partially directed by the principal via gesture commands.

Illustrated Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include communication session server computer (CSSC) 110, principal computers 102-108, agent computers 112-118, and network 108.

In various embodiments, system 100 includes a communication session (CS) platform 140. CS platform 140 may include one or more server computers, such as but not limited to CSSC 110. CS platform 140 may include one or more instances of mobile or network computers, including but not limited to any of mobile computer 200 of FIG. 2 and/or network computer 300 of FIG. 3. In at least one embodiment, CS platform 140 includes at least one or more of the agent computers 112-118 and/or one or more of the principal computers 102-108. Various embodiments of CS platform 140 may enable the content streaming for real-time, or near real-time, remote services. As discussed throughout, CS platform 140 may include one or more engines, such as but not limited to one or more communication session engines to enable users to participate in real-time, or near real-time communication sessions.

Although not shown in FIG. 1, in some embodiments, CS platform 140 may include one or more additional server computers to perform at least a portion of the various processes discussed herein. For instance, CS platform 140 may include one or more sourcing server computers, training server computers, honing server computers, and/or aggregating server computers. At least a portion of the server computers included in CS platform 140, such as but not limited these additional server computers, CSSC 110, and the like may at least partially form a data layer of the CS platform 140. Such a data layer may interface with and append data to other platforms and other layers within CS platform 140. For instance, the data layer may interface with other platforms, such as but not limited to social networking platforms, crowd-sourcing platforms, content streaming platforms, or the like.

Although not shown, CS platform 140 may include one or more data storage devices, such as rack or chassis-based data storage systems. Any of the databases discussed herein may be at least partially stored in data storage devices within platform 140. As shown, any of the network devices, including the data storage devices included in platform 140 are accessible by other network devices, via network 108.

Various embodiments of agent computers 112-118 are described in more detail below in conjunction with mobile computer 200 of FIG. 2. Furthermore, at least another embodiment of agent computers 112-118 is described in more detail in conjunction with network computer 300 of FIG. 3. Briefly, in some embodiments, at least one of the agent computers 112-118 may be configured to communicate with at least one mobile and/or network computer included in CS platform 140, including but not limited to CSSC 110. In some embodiments, at least one of the agent computers 112-118 may be configured to communicate with at least one of principal computers 102-108. In various embodiments, one or more agent computers 112-118 may be enabled to capture, provides, and/or receive communication session data. The communication session (CS) data may include image content, including but not limited to video content. In at least one embodiment, the CS data includes audio and/or textual content. Agent computers 112-118 may provide the CS data to at least one computer.

Agent computers 112-118 may be enabled to communicate (e.g., via a Bluetooth or other wireless technology, or via a USB cable or other wired technology) with a camera. In some embodiments, at least some of principal computers 102-108 may operate over a wired and/or wireless network, including network 108, to communicate with other computing devices, including any of principal computers 102-108 and/or any computers included in CS platform 140.

Generally, agent computers 112-118 may include computing devices capable of communicating over a network to send and/or receive information, perform various online and/or offline activities, or the like. It should be recognized that embodiments described herein are not constrained by the number or type of agent computers employed, and more or fewer agent computers—and/or types of agent computers—than what is illustrated in FIG. 1 may be employed. At least one agent computers 112-118 may be a client computer.

Devices that may operate as agent computers 112-118 may include various computing devices that typically connect to a network or other computing device using a wired and/or wireless communications medium. Agent computers 112-118 may include mobile devices, portable computers, and/or non-portable computers. Examples of non-portable computers may include, but are not limited to, desktop computers, personal computers, multiprocessor systems, microprocessor-based or programmable electronic devices, network PCs, or the like, or integrated devices combining functionality of one or more of the preceding devices. Examples of portable computers may include, but are not limited to, laptop computer 112. Laptop computer 112 is communicatively coupled to a camera via a Universal Serial Bus (USB) cable or some other (wired or wireless) bus capable of transferring data. Examples of mobile computers include, but are not limited to, smart phone 114, tablet computers 186, cellular telephones, display pagers, Personal Digital Assistants (PDAs), handheld computers, wearable computing devices, or the like, or integrated devices combining functionality of one or more of the preceding devices. Agent computers may include a networked computer, such as networked camera 116. As such, agent computers 112-118 may include computers with a wide range of capabilities and features.

Agent computers 112-118 may access and/or employ various computing applications to enable users to perform various online and/or offline activities. Such activities may include, but are not limited to, generating CS data, capturing/manipulating images, managing media, managing financial information, playing games, managing personal information, browsing the Internet, or the like. In some embodiments, agent computers 112-118 may be enabled to connect to a network through a browser, or other web-based application.

Agent computers 112-118 may further be configured to provide information that identifies the agent computer. Such identifying information may include, but is not limited to, a type, capability, configuration, name, or the like, of the agent computer. In at least one embodiment, an agent computer may uniquely identify itself through any of a variety of mechanisms, such as an Internet Protocol (IP) address, phone number, Mobile Identification Number (MIN), media access control (MAC) address, electronic serial number (ESN), or other device identifier.

Various embodiments of principal computers 102-108 are described in more detail below in conjunction with mobile computer 200 of FIG. 2. Furthermore, at least one embodiment of principal computers 102-108 is described in more detail in conjunction with network computer 300 of FIG. 3. Briefly, in some embodiments, at least one of the principal computers 102-108 may be configured to communicate with at least one mobile and/or network computer included in CS platform 140, including but not limited to CSSC 110, ATPSC 120, CSSC 130, and the like. In some embodiments, at least one of the principal computers 102-108 may be configured to communicate with at least one of pagent computers 112-118. In various embodiments, one or more principal computers 102-108 may be enabled to capture, provides, and/or receive CS data. In various embodiments, one or more principal computers 102-108 may be enabled to access, interact with, and/or view user interfaces, streaming content, assessment tools, and the like provided by CS platform 140, such as through a web browser. Principal computers 102-108 may provide the CS data to at least one computer.

Principal computers 102-108 may be enabled to communicate (e.g., via a Bluetooth or other wireless technology, or via a USB cable or other wired technology) with CS platform 140. In some embodiments, at least some of principal computers 102-108 may operate over a wired and/or wireless network to communicate with other computing devices, including any of agent computers 112-118 and/or any computer included in APT platform 140.

Generally, principal computers 102-108 may include computing devices capable of communicating over a network to send and/or receive information, perform various online and/or offline activities, or the like. It should be recognized that embodiments described herein are not constrained by the number or type of principal computers employed, and more or fewer principal computers—and/or types of principal computers—than what is illustrated in FIG. 1 may be employed. At least one principal computer 102-108 may be a client computer.

Devices that may operate as principal computers 102-108 may include various computing devices that typically connect to a network or other computing device using a wired and/or wireless communications medium. Principal computers 102-108 may include mobile devices, portable computers, and/or non-portable. Examples of non-portable computers may include, but are not limited to, desktop computers 102, personal computers, multiprocessor systems, microprocessor-based or programmable electronic devices, network PCs, or the like, or integrated devices combining functionality of one or more of the preceding devices. Examples of portable computers may include, but are not limited to, laptop computer 104. Examples of mobile computers include, but are not limited to, smart phone 106, tablet computers 108, cellular telephones, display pagers, Personal Digital Assistants (PDAs), handheld computers, wearable computing devices, or the like, or integrated devices combining functionality of one or more of the preceding devices. As such, principal computers 102-108 may include computers with a wide range of capabilities and features.

Principal computers 102-108 may access and/or employ various computing applications to enable users to perform various online and/or offline activities. Such activities may include, but are not limited to, generating CS data, generating documents, gathering/monitoring data, capturing/manipulating images, reviewing content, managing media, managing financial information, playing games, managing personal information, browsing the Internet, or the like. In some embodiments, principal computers 102-108 may be enabled to connect to a network through a browser, or other web-based application.

Principal computers 102-108 may further be configured to provide information that identifies the principal computer. Such identifying information may include, but is not limited to, a type, capability, configuration, name, or the like, of the principal computer. In at least one embodiment, a principal computer may uniquely identify itself through any of a variety of mechanisms, such as an Internet Protocol (IP) address, phone number, Mobile Identification Number (MIN), media access control (MAC) address, electronic serial number (ESN), or other device identifier.

Various embodiments of CSSC 110 are described in more detail below in conjunction with network computer 300 of FIG. 3. At least one embodiment of CSSC 110 is described in conjunction with mobile computer 200 of FIG. 2. Briefly, in some embodiments, CSSC 110 may be operative to at least enable a communication session between one or more principal computers 102-108 and one or more agent computers 112-118. As such, CSSC 110 may be operative to communicate with agent computers 112-118 to enable users of agent computers 112-118 to generate and provide CS data to users of principal computers 102-108. Likewise, CSSC 110 may be operative to communicate with principal computers 102-108 to enable users of principal computers 102-108 to generate and provide CS data to users of agent computers 112-118.

Network 108 may include virtually any wired and/or wireless technology for communicating with a remote device, such as, but not limited to, USB cable, Bluetooth, Wi-Fi, or the like. In some embodiments, network 108 may be a network configured to couple network computers with other computing devices, including principal computers 102-105, network computers 112, and the like. In at least one of various embodiments, sensors may be coupled to network computers via network 108, which is not illustrated in FIG. 1. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least principal computer 102-108, agent computers 112-118, and the like. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), Open Tok protocol, or any of a variety of other communication protocols and/or technologies. In essence, the network may include communication technologies by which information may travel between principal computers 102-108, agent computers 112-118, computers included in CS platform 140, other computing devices not illustrated, other networks, and the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Illustrative Mobile Computer

Figure 2:
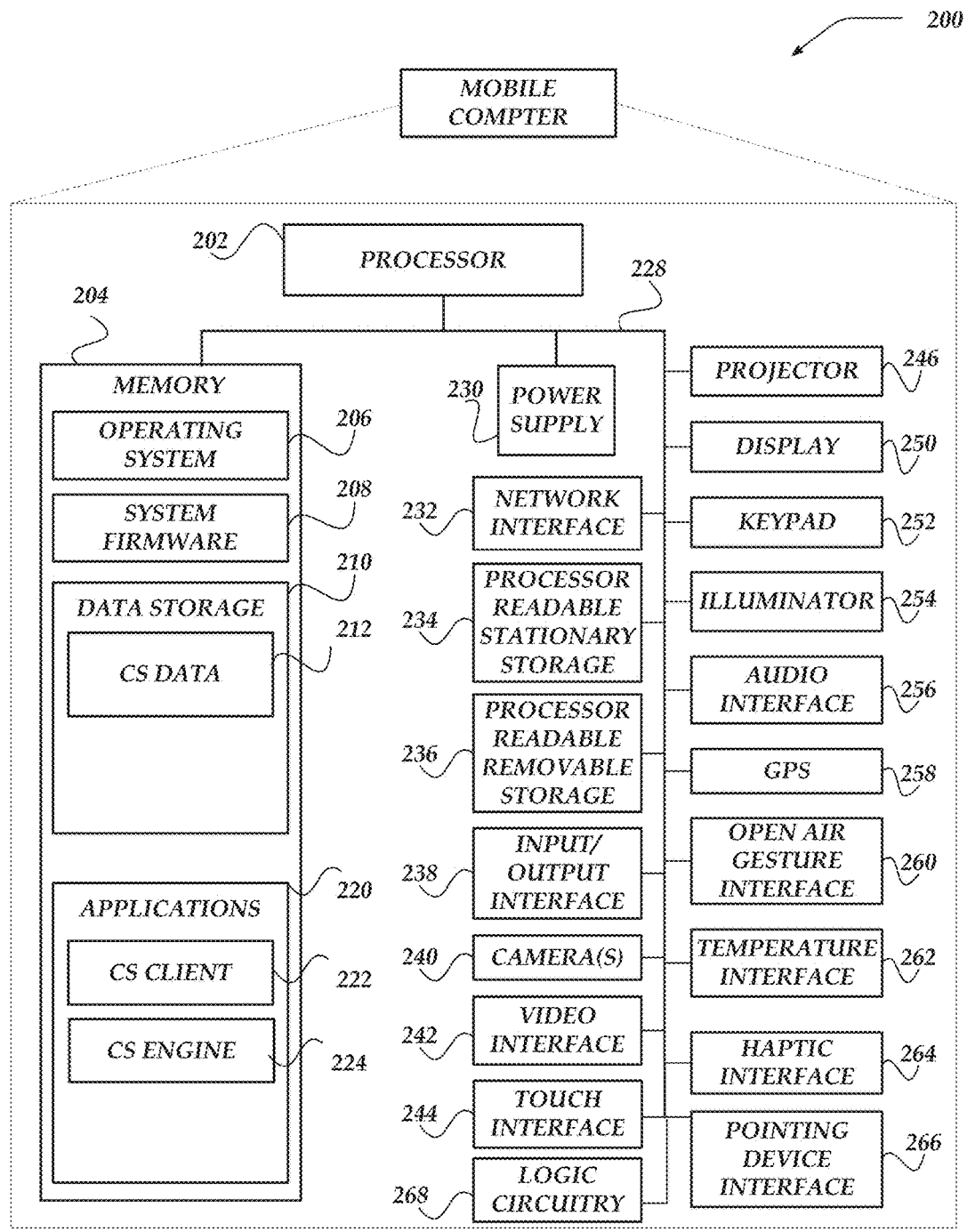
FIG. 2 shows an embodiment of a client computer that may be included in a system such as that shown in FIG. 1.

FIG. 2 shows one embodiment of mobile computer 200 that may include many more or less components than those shown. Mobile computer 200 may represent, for example, at least one embodiment of agent computers 112-118, principal computers 102-108, or any computer included in CS platform 140. Mobile computer 200 may be a mobile device (e.g., a smart phone or tablet), a stationary/desktop computer, or the like.

Mobile computer 200 may include processor 202, such as a central processing unit (CPU), in communication with memory 204 via bus 228. Mobile computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Mobile computer 200 may optionally communicate with a base station (not shown), or directly with another computer. And in one embodiment, although not shown, an accelerometer or gyroscope may be employed within mobile computer 200 to measuring and/or maintaining an orientation of mobile computer 200.

Additionally, in one or more embodiments, the mobile computer 200 may include logic circuitry 268. Logic circuitry 268 may be an embedded logic hardware device in contrast to or in complement to processor 202. The embedded logic hardware device may directly execute its embedded logic to perform actions, e.g., an Application Specific Integrated Circuit (ASIC), Field Programmable Gate Array (FPGA), and the like.

Also, in one or more embodiments (not shown in the figures), the mobile computer may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

Power supply 230 may provide power to mobile computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling mobile computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce, generate, and receive audio signals and/or audio data such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of mobile computer 200, e.g., using voice recognition, detecting touch based on sound, and the like. A microphone may be used to capture audio data and/or CS data.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures. Accordingly, display 250 may be a touch-sensitive display device.

In additional to gesture sensors touch-sensitive display 250, touch interface 244, open air gesture interface 260, and keypad 254, mobile computer 200 may include addition gesture sensors, such as but not limited to one or more accelerometers and/or one or more gyroscopes.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Mobile computer 200 may also comprise input/output interface 238 for communicating with external peripheral devices or other computers such as other mobile computers and network computers. Input/output interface 238 may enable mobile computer 200 to communicate with one or more servers, such as CSSC 110 of FIG. 1. In some embodiments, input/output interface 238 may enable mobile computer 200 to connect and communicate with one or more network computers, such as agent computers 112-118 and principal computers 102-118 of FIG. 1. Other peripheral devices that mobile computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a mobile computer 200. For example, the haptic interface 264 may be employed to vibrate mobile computer 200 in a particular way when another user of a computer is calling. Temperature interface 262 may be used to provide a temperature measurement input and/or a temperature changing output to a user of mobile computer 200. Open air gesture interface 260 may sense physical gestures of a user of mobile computer 200, for example, by using single or stereo video cameras, radar, a gyroscopic sensor inside a computer held or worn by the user, or the like. Camera 240 may be used to track physical eye movements of a user of mobile computer 200. Camera 240 may be used to capture image data and/or communication session (CS) data. Accordingly, camera 240 may include one or more image sensors.

GPS transceiver 258 can determine the physical coordinates (or regp-location) of mobile computer 200 on the surface of the Earth, which typically outputs a location as latitude and longitude values. Accordingly, GPS transceiver 258 may include one or more GPS sensors. Physical coordinates of a mobile computer that includes a GPS transceiver may be referred to as geo-location data. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile computer 200 on the surface of the Earth. It is understood that under different conditions, GPS transceiver 258 can determine a physical location for mobile computer 200. In at least one embodiment, however, mobile computer 200 may, through other components, provide other information that may be employed to determine a physical location of the mobile computer, including for example, a Media Access Control (MAC) address, IP address, and the like. In at least one embodiment, GPS transceiver 258 is employed for localization of the various embodiments discussed herein. For instance, the various embodiments may be localized, via GPS transceiver 258, to customize the linguistics, written language, cultural preferences, religious preferences, climate, seasons, holidays, special events, technical parameters, time zones, configuration parameters, units of measurement, monetary units, and the like based on the location of a user of mobile computer 200.

Human interface components can be peripheral devices that are physically separate from mobile computer 200, allowing for remote input and/or output to mobile computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A mobile computer 200 may include a browser application that is configured to receive and to send web pages, web-based messages, graphics, text, multimedia, and the like. Mobile computer's 200 browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

In various embodiments, the browser application may be configured to enable a user to log into an account and/or user interface to access/view content data and/or CS data. In at least one of various embodiments, the browser may enable a user to participate in one or more communications sessions, as well as view and/or review CS data transmitted by CS platform 110 of FIG. 1. In some embodiments, the browser/user interface may enable the user to customize a view of the communication session. As described herein, the extent to which a user can customize the viewing and/or participating in the communication session may depend on permissions/restrictions for that particular user.

In various embodiments, the user interface may present the user with one or more web interfaces for capturing CS data. In some embodiments, the user interface may present the user with one or more web interfaces for participating in one or more communication sessions.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of mobile computer 200. The memory may also store operating system 206 for controlling the operation of mobile computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by mobile computer 200 to store, among other things, applications 220 and/or other data. For example, data storage 210 may store CS data 212. As discussed throughout, any of the CS data 212, including but not limited to image/video data, textual data, audio data, gesture data, augmented reality (AR) data, virtual reality (VR) data, sensor data, or the like may be structured data and/or be included in one or more data structures. Data storage 210 may further include program code, data, algorithms, and the like, for use by a processor, such as processor 202 to execute and perform actions. In one embodiment, at least some of data storage 210 might also be stored on another component of mobile computer 200, including, but not limited to, non-transitory processor-readable removable storage device 236, processor-readable stationary storage device 234, or even external to the mobile device. Removable storage device 236 may be a USB drive, USB thumb drive, dongle, or the like.

Applications 220 may include computer executable instructions which, when executed by mobile computer 200, transmit, receive, and/or otherwise process instructions and data. Applications 220 may include communication session (CS) client 222 and/or CS engine 224. CS client 222 and/or CS engine 224 may capture, manage, send, and/or receive CS data, gesture data, session control data, and the like, when a user is participating in a communication session. CS client 222 may include, or otherwise interact with, one or more engines, such as but not limited to one or more CS engine 224. In some embodiments, CS client 222 may be embedded in and/or included in CS engine 224. In other embodiments CS engine 224 may be embedded in and/or included in CS client 222. In various embodiments, either singly or in combination CS client 222 and CS engine 224 may be enabled to perform the processes, or at least portions of the processes discussed herein. For instance, either singly or in combination CS client 222 and/or CS engine 224 may be enabled to perform processes (or portions thereof) 400, 500, 600, 700, and 750 of FIGS. 4-7B.

Other examples of application programs that may be included in applications 220 include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, mobile computer 200 may be enabled to employ various embodiments, combinations of embodiments, processes, or parts of processes, as described herein. Moreover, in various embodiments, mobile computer 200 may be enabled to employ various embodiments described above in conjunction with any computer device of FIG. 1.

Illustrative Network Computer

Figure 3:
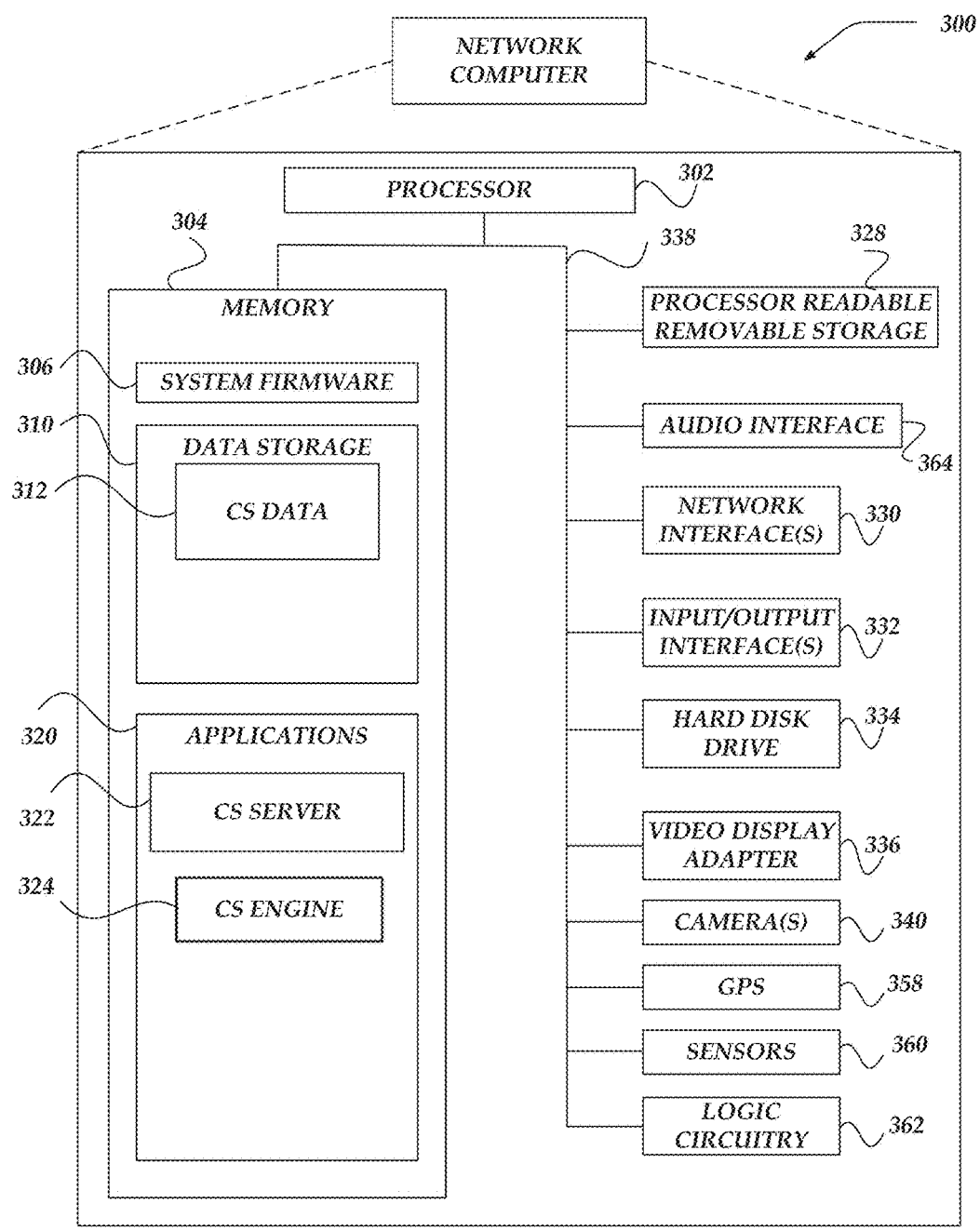
FIG. 3 illustrates an embodiment of a server computer that may be included in a system such as that shown in FIG. 1.

FIG. 3 shows one embodiment of network computer 300, according to one embodiment of the invention. Network computer 300 may represent, for example, at least one embodiment of agent computers 112-118, principal computers 102-108, or any computer included in CS platform 140. Network computer 300 may be a desktop computer, a laptop computer, a server computer, a client computer, and the like.

Network computer 300 may include processor 302, such as a CPU, processor readable storage media 328, network interface unit 330, an input/output interface 332, hard disk drive 334, video display adapter 336, GPS 338, and memory 304, all in communication with each other via bus 338. In some embodiments, processor 302 may include one or more central processing units.

Additionally, in one or more embodiments (not shown in the figures), the network computer may include an embedded logic hardware device instead of a CPU. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the network computer may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

As illustrated in FIG. 3, network computer 300 also can communicate with the Internet, cellular networks, or some other communications network (either wired or wireless), via network interface unit 330, which is constructed for use with various communication protocols. Network interface unit 330 is sometimes known as a transceiver, transceiving device, or network interface card (NIC). In some embodiments, network computer 300 may communicate with a agent computer, principal computer, or a computer included in an CS platform, or any other network computer, via the network interface unit 320.

Network computer 300 also comprises input/output interface 332 for communicating with external devices, such as a various sensors or other input or output devices not shown in FIG. 3. Input/output interface 332 can utilize one or more communication technologies, such as USB, infrared, Bluetooth™, or the like.

Memory 304 generally includes RAM, ROM and one or more permanent mass storage devices, such as hard disk drive 334, tape drive, optical drive, and/or floppy disk drive. Memory 304 may store system firmware 306 for controlling the low-level operation of network computer 300 (e.g., BIOS). In some embodiments, memory 304 may also store an operating system for controlling the operation of network computer 300.

Although illustrated separately, memory 304 may include processor readable storage media 328. Processor readable storage media 328 may be referred to and/or include computer readable media, computer readable storage media, and/or processor readable storage device. Processor readable removable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by network computer 300 to store, among other things, CS data 312 and/or other data. As discussed throughout, any of the CS data 312, including but not limited to image/video data, textual data, audio data, gesture data, augmented reality (AR) data, virtual reality (VR) data, sensor data, or the like may be structured data and/or be included in one or more data structures. For example, data storage 310 may further include program code, data, algorithms, and the like, for use by a processor, such as processor 302 to execute and perform actions. In one embodiment, at least some of data storage 310 might also be stored on another component of network computer 300, including, but not limited to processor-readable storage media 328, hard disk drive 334, or the like.

Applications 320 may include computer executable instructions that can execute on processor 302 to perform actions. In some embodiments, one or more of applications 320 may be part of an application that may be loaded into mass memory and run on an operating system Applications 320 may include one or more engines, such as but not limited to a communication session engine. Applications 320 may include communication sessions (CS) server 322 and/or CS engine 324. CS server 322 and/or CS engine 324 may enable users of a platform to participate in one or more communication sessions. CS server 322 and/or CS engine 324 may capture, manage, send, and/or receive CS data, gesture data, session control data, and the like, when a user is participating in a communication session. CS server 322 may include one or more engines, such as but not limited to one or more communication session engines, such as but not limited to CS engine 324. In some embodiments, CS server 322 may be embedded in and/or included in CS engine 324. In other embodiments CS server 324 may be embedded in and/or included in CS server 322. In various embodiments, either singly or in combination CS server 322 and CS engine 324 may be enabled to perform the processes, or at least portions of the processes discussed herein. For instance, either singly or in combination CS server 322 and/or CS engine 324 may be enabled to perform processes (or portions thereof) 400, 500, 600, 700, and 750 of FIGS. 4-7B.

Furthermore, applications 320 may include one or more additional applications. At least a portion of the server applications in applications 320 may at least partially form a data layer of the CS platform 140 of FIG. 1.

GPS transceiver 358 can determine the physical coordinates of network computer 300 on the surface of the Earth, which typically outputs a location as latitude and longitude values. Physical coordinates of a network computer that includes a GPS transceiver may be referred to as geolocation data. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 358 can determine a physical location for network computer 300. In at least one embodiment, however, network computer 300 may, through other components, provide other information that may be employed to determine a physical location of the mobile computer, including for example, a Media Access Control (MAC) address, IP address, and the like. In at least one embodiment, GPS transceiver 358 is employed for localization of the various embodiments discussed herein. For instance, the various embodiments may be localized, via GPS transceiver 258, to customize the linguistics, technical parameters, time zones, configuration parameters, units of measurement, monetary units, and the like based on the location of a user of mobile computer 200.

User interface 324 may enable the user to provide the collection, storage, and transmission customizations described herein. In some embodiments, user interface 324 may enable a user to view to collected data in real-time or near-real time with the network computer.

Audio interface 364 may be arranged to produce and receive audio signals such as the sound of a human voice. For example, audio interface 354 may be coupled to a speaker and microphone (not shown) to enable telecommunication with others and/or generate an audio acknowledgement for some action. A microphone in audio interface 364 can also be used for input to or control of network computer 300, e.g., using voice recognition, detecting touch based on sound, and the like. A microphone may be used to capture audio data and/or CS data. Likewise, camera 340 may be used to capture image data and/or CS data. Camera 240 may include one or more image sensors. Other sensors 360 may be included to sense a location, user gestures, or other environment components.

Additionally, in one or more embodiments, the network computer 300 may include logic circuitry 362. Logic circuitry 362 may be an embedded logic hardware device in contrast to or in complement to processor 302. The embedded logic hardware device would directly execute its embedded logic to perform actions, e.g., an Application Specific Integrated Circuit (ASIC), Field Programmable Gate Array (FPGA), and the like.

So, in some embodiments, network computer 300 may be enabled to employ various embodiments, combinations of embodiments, processes, or parts of processes, as described herein. Moreover, in various embodiments, network computer 300 may be enabled to employ various embodiments described above in conjunction with any computer device of FIG. 1. Similar to mobile computer 200 of FIG. 2, network computer may include one or more gesture sensors, such as but not limited to a touch-sensitive display, one or more accelerometers, one or more gyroscopes, and the like.

Generalized Operations

The operation of certain aspects of the invention will now be described with respect to FIGS. 4-7B. In at least one of various embodiments, processes 400, 500, 600, 700, and 750 described in conjunction with FIGS. 4-7B, respectively, or portions of these processes may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more mobile computers, such as mobile computer 200 as shown in FIG. 2. Also, in at least one of the various embodiments, these processes or portions of these processes may be implemented by and/or executed on one or more cloud instances operating in one or more cloud networks. However, embodiments are not so limited and various combinations of network computers, client computer, cloud computer, or the like, may be utilized. These processes or portions of these processes may be implemented on any computer of FIG. 1, including, but not limited to agent computers 112-118, principal computers 102-108, or any computer included in CS platform 140. These processes or portions of these processes may be implemented on or performed by one or more engines, such as but not limited to one or more communication session engines, such as CS engine 224 of FIG. 2 or CS engine 324 of FIG. 3.

Figure 4:
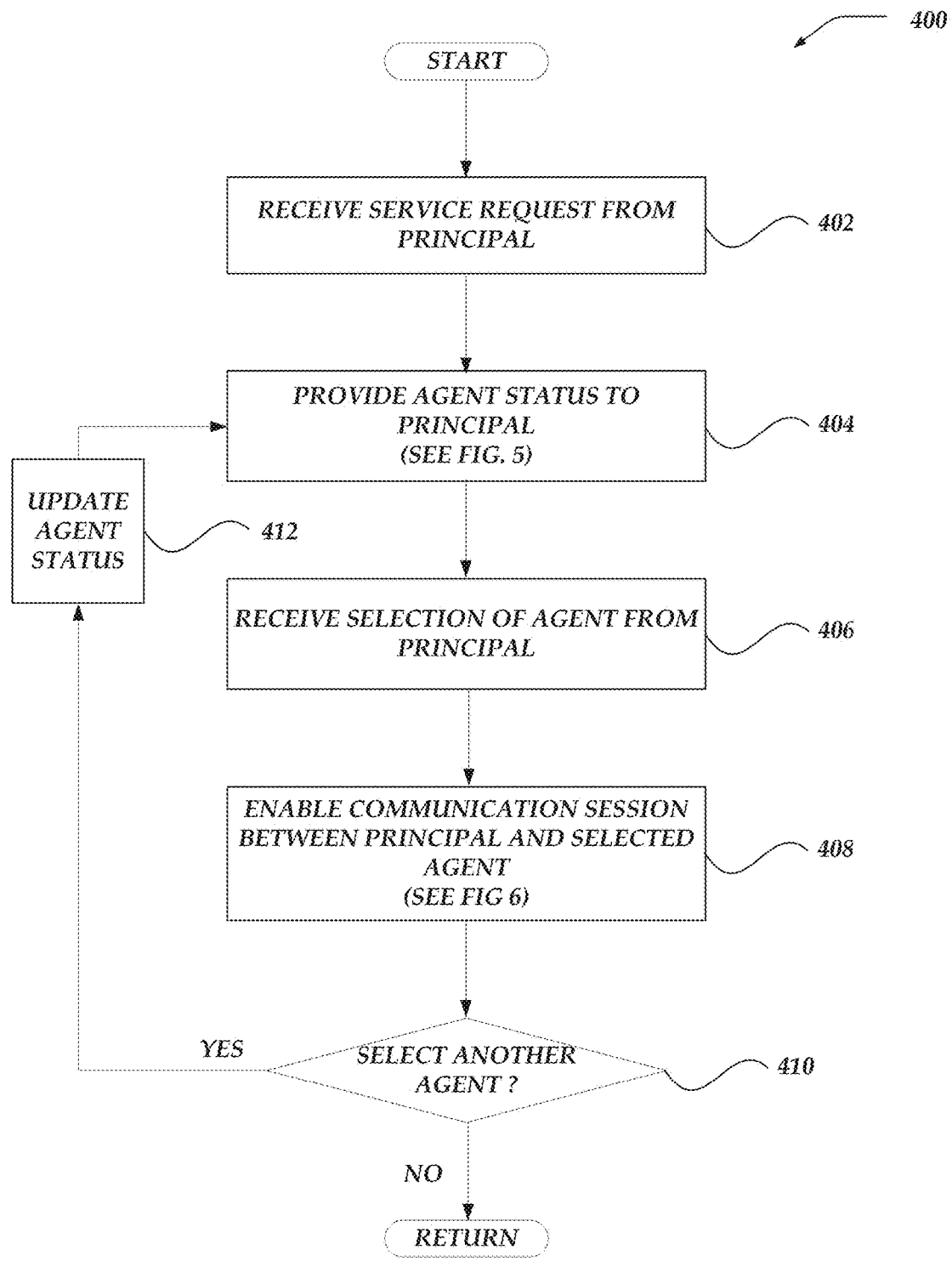
FIG. 4 shows an overview flowchart for a process to enable providing remote services to a user, in accordance with at least some of the various embodiments.

FIG. 4 shows an overview flowchart for a process to enable providing remote services to a user, in accordance with at least some of the various embodiments. Process 400 begins, after a start block, at block 402 where a service request is received from a user. The user that has provided the service request may be a principal user, or simply a principal. The principal may be a user of a computer, such as but not limited to any of principal computers 102-108 of FIG. 1, mobile computer 200 of FIG. 2, network computer 300 of FIG. 3, or the like. As such, the principal may provide the service request by employing one or more user interfaces (UI) provided by the computer.

In various embodiments, and as user herein, a principal user may be referred to as a "Zoomie user," or simply as a "Zoomie." Likewise, an agent user may be referred to as a "Zoomer user," or simply as a "Zoomer." A service request may be referred to as a "Zoom request."

The requested services may be services that are to be carried out in real time remotely from the location of the principal. The services may include virtually any service that one or more other remote users (agents) may provide or otherwise perform for the principal. As such, the requested services may be location-drive, event-driven, time-driven (time of day, time of year, holiday, or the like), shopping, topic-based, or the like. In at least one embodiment, the service includes at least remote audio recording, photography, videography, and the like. However, other embodiments are not so constrained. Although many of the embodiments discussed herein include remote videography services, virtually any type of service may be requested in the various embodiments discussed herein.

In at least one or more of the embodiments, a principal may request remote videography services based on at least one of a location (such as a landmark), an event (such as a sporting or musical event), a consumer product, or a topic for which an agent may have a particular expertise. For instance, the requested service may include instruction or tutoring in a specific topic, such as an academic subject, linguistics/language, or the like. Thus, an agent may be requested to provide knowledge, tutoring, or information regarding the topic.

Because many types of services may be requested, the service request may include a type of requested service. For instance, a principal may request videography services. As such, the requested service type may include, but is not otherwise limited to, videography and/or still image services. Such request types may further include acquiring, purchasing, shipping, and/or delivery service of a physical product. A principal may request that a remote agent purchase a physical item that is located near the agent and ship and/or deliver the purchased item to the principal. Thus, a principal may request personal shopping services.

As discussed above, such services may include instructional services, such as but not limited to tutoring. Thus, a service type for a requested service may be informational and/or instructional. For instance, principal may request the services of an agent regarding maintenance on their home, vehicle, or the like. A principal may request tutoring services in high school physics.

As another embodiment, a principal may request for real-time translational services. For example, when traveling in a region that the inhabitants do not generally speak the principal's preferred language, a principal may request language translation services such that the principal may communicate, in almost real-time, with another person in the region. As another example, a principal may provide an image of a sign, or other item that includes textual information in one language and request translation services for the sign. In such embodiments, the principal may provide image data (including the sign) in either the service request, or during a communication session with an agent that is to provide the translation service. In such embodiments, the service request may include one or more topics, such as an academic subject, languages to translate between, or other knowledge areas.

Because the services may be performed by an agent that is remote from the principal, the service request may include a location that is remote from the principal. The location may include a geo-location, or an approximate geo-location, as to where the requested services are to be provided. For instance, a principal, located in City A, may desire videography services, to be carried out near a landmark located within City B. For embodiments where the requested service type is an acquisition and/or purchasing, a source location, as well as a delivery location may be included in the service request. In at least one embodiment, the location of the principal is also provided in the service request.

Note that not all service request may include a service location. For instance, the principal may be agnostic as to the location of agent that is to perform the requested services. For instance, for the instructional, informational, or translational service requests discussed herein, the agent may be located virtually anywhere. Accordingly, for at least these services requests and in some embodiments, a service location may be included in the request.

For embodiments that do include a service location, the principal may provide the service location (and/or the principal location) by providing an address, zip code, city name, geo-location coordinates, or the like via a UI. In some embodiments, when providing a service request, a principal may provide the service location by employing a UI to drop one or more interactive pins or other icons on an interactive map within the UI. The location of the pin on the interactive map may at least approximate or indicate the coordinates for the location. In at least one embodiment, the principal location may be automatically provided based on at least a signal generated by a GPS transceiver included in the computer employed or used by the principal. In some embodiments, the agent to perform the services may be provided the principal's location. In at least one embodiment, the principal's location may not be provided to the agent.

In some embodiments, a vicinity of the service location is automatically determined or otherwise manually included in the service request. A vicinity of the location may include an area, a perimeter or circumference of the area, or the like, wherein the location of the services to be provided are within the area. In at least one embodiment, the principal may be enabled to provide the vicinity by drawing, or otherwise defining, a perimeter of vicinity on the interactive map.

In some embodiments, the principal may provide the service location and one or more distances from the service location to define the vicinity. For instance, the principal may provide the service location and a radius about the service location to define an approximately circular vicinity. The vicinity may be automatically determined based on one or more threshold or default radii and the location.

The service request may include other details regarding the nature of requested services. For instance, the service request may include at least an approximate amount of resources required to perform the services, such as time, financial resources, physical labor, or the like. In at least one embodiment, the details may include an approximate amount of time that videography services are required. The details may include a subject to provide instruction, an event, a specific landmark, a physical item, cost, or the like.

Figure 8A:
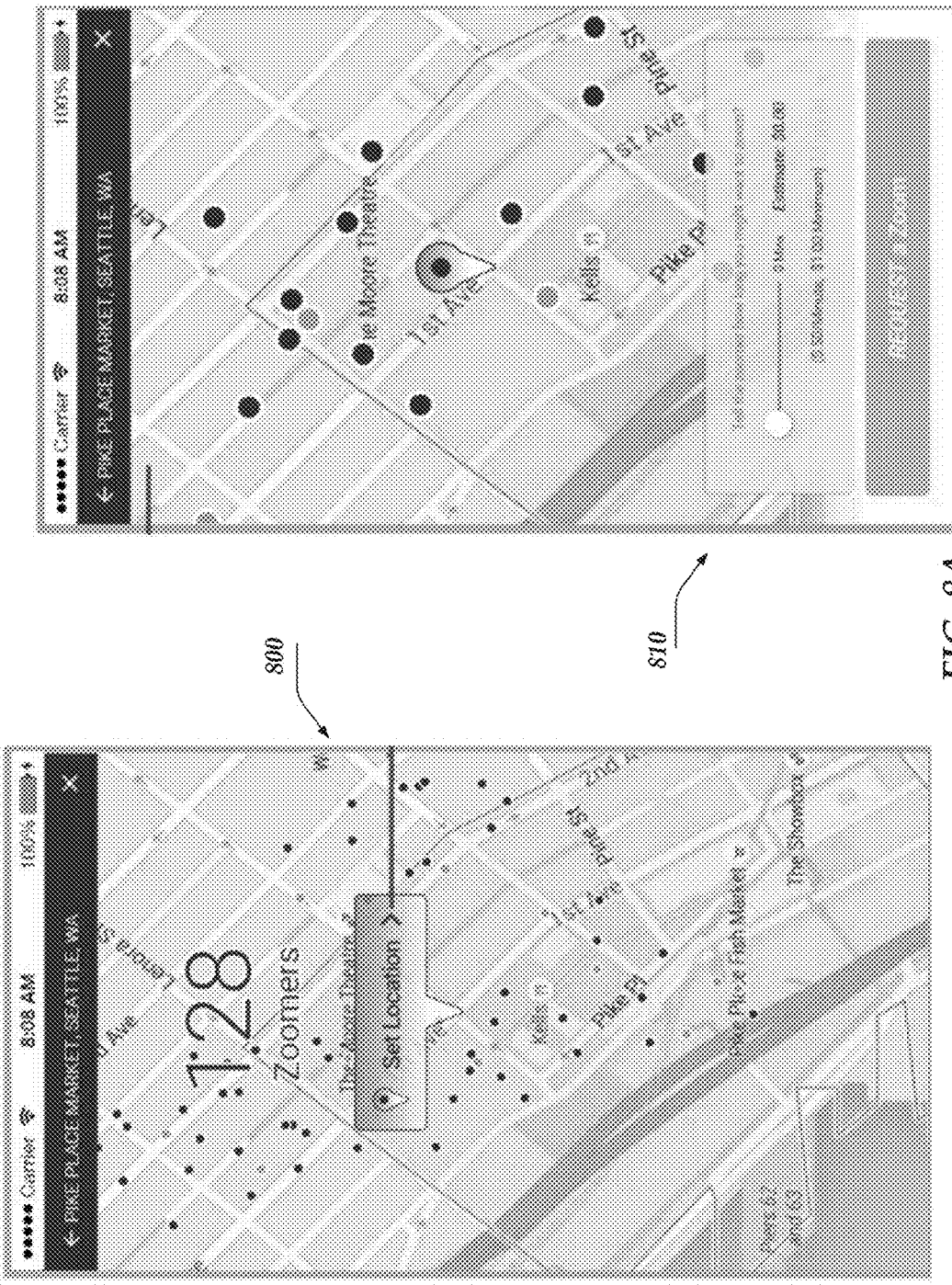
FIG. 8A illustrates a user interface that enables a principal user to provide a service request that includes a service location, in accordance with various embodiments.

FIG. 8A illustrates a user interface that enables a principal to provide a service request that includes a service location, in accordance with various embodiments. Views 800 and 810 of FIG. 8A shows a principal user, or Zoomie, providing a service request, or Zoom request by employing a UI that includes an interactive map. In view 800, the principal is interactively setting the service location by setting a pin, or other icon, at the service location, on the interactive map. The interactive map also shows the location of agent users, or "Zoomers" that are within a vicinity of the service location and have previously indicated their availability via signing on to a platform, or providing another such indication. The plurality of dots show at least an approximate current geo-location of each of the available Zoomers, with respect to the service location provided by the Zoomie. Thus, in view 800, there 128 available Zoomers within the vicinity. The vicinity may be predefined, or may be interactively provided by the Zoomie.

In some embodiments, a Zoomer or agent need not provide their at least approximate geo-location by manually or automatically signing onto the platform or application. Such embodiments may receive periodic or asynchronous updates regarding the agent's approximate geo-location, via a telemetry data provided by the agent's computer device. Such telemetry may be provided at a predetermined frequency. In other embodiments, at least the portion of the telemetry data that includes an agent's geo-location may be provided only when there has been a significant change in the agent's location since that last geo-location update was provided. Such embodiments provide the benefit of not requiring periodic updates when the agent's location has not changed significantly, thus conserving and ensuring the efficient use of power resources of the agent's computer.

Accordingly, a change in location distance threshold may be applied to determine when to provide an update in the telemetry stream for the agent's location. In at least one embodiment, if the change in the agent's location has not exceed the change in location distance threshold for a time threshold (for instance 24 hours), an update in the agent's location may automatically be provided, via the telemetry stream.

In view 810, the Zoomie has zoomed in on the interactive map of view 800. As such, the Zoomie is provided at least an indication (via the dots) of the closest available Zoomers, with respect to the service location, indicated by the larger pin. The UI, as shown in view 810, enables the Zoomie to provide other details regarding the Zoom request. For instance, the Zoomie may employ the slide bar to provide at least an approximate amount of time that videography services are required. An approximate cost for videography services may be provided, in real time, for the approximate amount of time.

Both view 800 and 810 provide an indication of a plurality of agents to the principal. Because the indication is presented via a visual map, the indication includes an indication of a distance between the service location (the pin) and the location of the agents (points). As discussed herein, the principal may be enabled to select at least one of the agents.

Figure 8B:
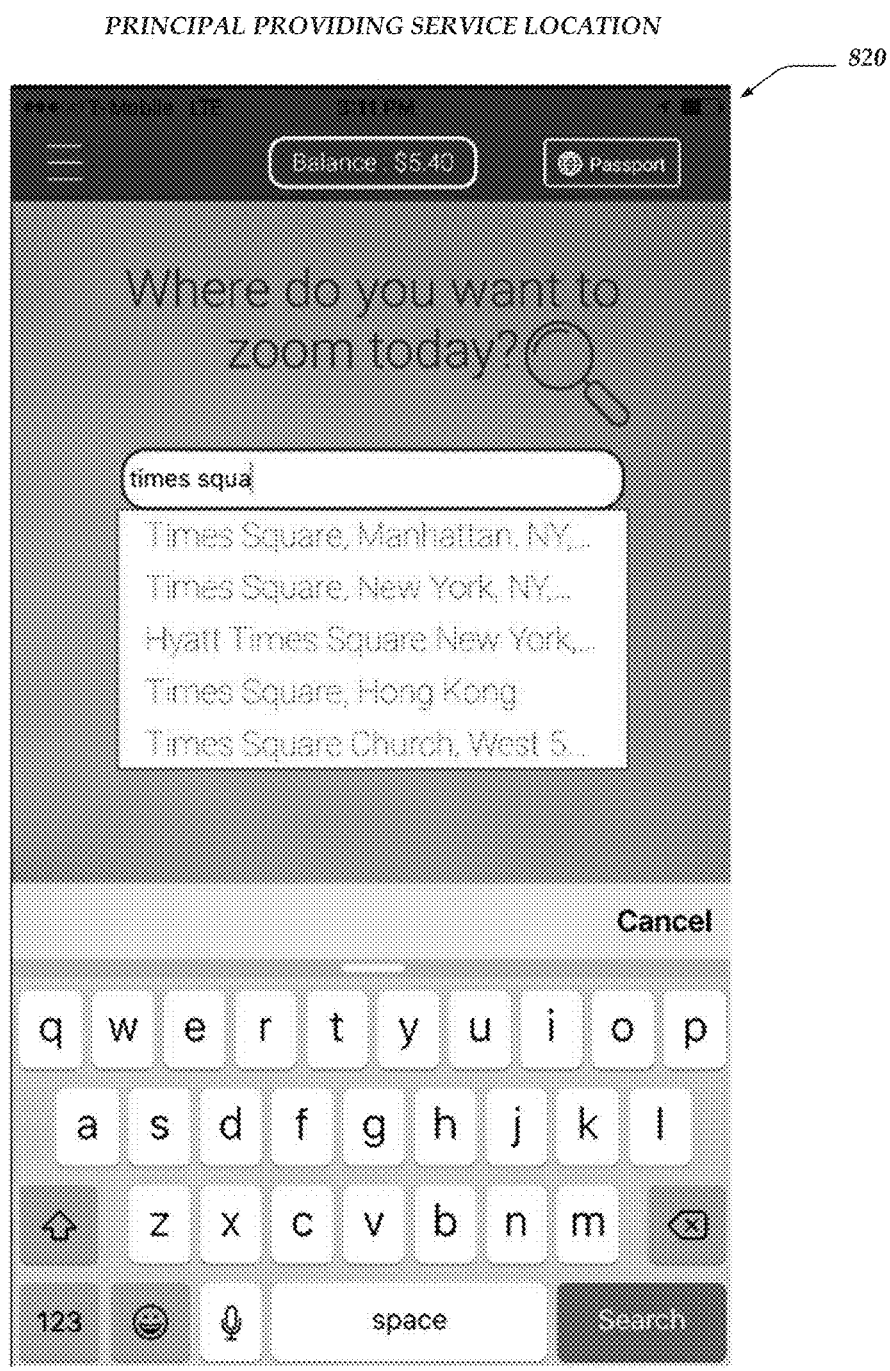
FIG. 8B illustrates another embodiment of a user interface that enables a principal user to provide a service request that includes a service location, via a direct locational search or geo-coordinates to indicate a specific location, region, or event.

FIG. 8B illustrates another embodiment of a user interface that enables a principal user to provide a service request that includes a service location, via a direct locational search and/or geo-coordinates to indicate a specific location region or event. In some embodiments, other means may be employed to indicate a specific geographic location, region, or event. View 820 of FIG. 8B shows a principal user, or Zoomie, providing a service request, or Zoom request by employing a UI that enables the Zoomie to provide the service location by manually providing the location to the UI, via typing. As shown in view 820, an auto-complete functionality may be employed to assist the Zoomie when manually providing the service location. Accordingly, at block 402, a service request may be received from the principal user for videography services. The service request may include a service location that is remoted from the location of the principal.

In at least one embodiment, a service request may be at least partially initiated via another platform, website, application, or the like. For instance, a website for an event, location, or the like may include one or more indicators of at least one of the various embodiments discussed herein. Such an indicator may include an icon, button, graphic, or other visual display that provides a visual indication of at least one of the platforms discussed herein. Upon user selection of such an icon or indication, the user may be presented with a user interface (UI) to provide a service request.

For instance, a website, or other online portal for a concert may include such an indicator. A principal may select the indicator by one or more "clicks" or other selective action. A UI may provide as a pop-up to enable the user to provide a service request for videography and/or other services to be performed at that event. In such embodiments, the service location for the service request may be automatically generated based on the website, or other online source that provided the indicator. In some embodiments, the selection of the indicator may automatically launch an application, such as but not limited to a mobile application, on the user's computer to enable the user to generate and/or provide a service request.

In at least one embodiment, online interactive maps may be enabled to at least partially automatically generate a service request. Such online maps may be provided by another platform. For instance, a user may select a location on an online map, and at least a portion of a service request may be automatically generated based on the service location selected in the online map.

In regards to FIG. 4, at block 404, one or more agent statuses are provided to the principal. Various embodiments of providing agent statuses to a principal are discussed at least in conjunction of process 500 of FIG. 5. However, briefly, at block 404, an availability of one or more agents (or potential agents) that are enabled to perform the requested services are provided to the principal. In some embodiments, available agents within the vicinity of the service location of the service request are provided. An agent may be a user of another computer, such as but not limited to any of agent computers 112-118 of FIG. 1, mobile computer 200 of FIG. 2, network computer 300 of FIG. 3, or the like.

As discussed herein, an agent may be enabled to provide the requested service. For instance, if the requested service type is videography, the agent may employ their computer to capture at least video and/or image data, and provide that data to the requesting principal.

In some embodiments, the agent status provided to the principal may include at least references, links, icons, avatars, or the like that correspond to one or more agents within the vicinity of the requested location that are available and enabled to provide the requested service type. For instance, an interactive map may be provided to the principal, where at least an approximate geo-location of each available agent is shown via an icon, such as but not limited to a pin icon. The location of the requested service may also be shown on the interactive map with another icon, so that the principal may visually review at least an approximate distance between each of the available agents and the location of the requested service.

In some embodiments, the agent status provided to the principal may include references, links, icons, avatars, or the like that correspond to one or more available agents that are competent to provide the services. For instance, when the service request type is instructional, only available agents that are competent to provide the requested instruction, or have expertise or knowledge in the requested topic are provided to the principal. In some embodiments, a principal may only be concerned with the agent's competency, and not the agent's location. In such embodiments, the status of only available and competent, knowledgeable, or expert agents are provided to the principal. For instance, the availability of a particular agent may be based on one or more credentials of the agent. The credentials may include one or more professional endorsements, licenses, levels of education, knowledge, or skill, professional certifications, and the like. Accordingly, the credentials may be associated with the topic. Additionally, a profile may be provided for one or more agents that includes information, such as age, gender, access to a motor vehicle, cultural background, educational background, prior experience in providing the image capture service, and/or other information.

In embodiments where a plurality of agents are available, a ranking of the available agents are provided. For instance, the ranking may include but is not otherwise limited to a ranked list of the available agents. For instance, the available agents may be ranked via a physical distance from the location. In at least one embodiment, the available agents are ranked via one or more user ratings, reviews or relative rankings provided by other principals that have received services previously provided by the agent.

In some embodiments, the ranking may be based on one or more credentials, knowledge assessments, or the like, of the topic of the requested service. For instance, experts may be ranked above agents that are only competent, with regards to the performance, or required knowledge for the performance, of the services.

In some embodiments, the rakings may be based on a cost or fee associated with each of available agents. For instance, agents may require a fee to perform the requested services. In some embodiments, the agents may be ranked based on the fee. Agents may be ranked from most expensive fee to least expense fee, or vice versa. A principal may apply various filters to the ranking of the available agents. For instance, the principal may filter on the cost or fee associated with the agents. A user may apply such filters by employing the UI provided by the principal's computer.

At block 406, a selection of a particular agent from the one or more available agents is received. In at least one embodiment, the principal provides the selection of the available agent. For instance, a principal may select the particular agent from the agent statuses that were provided to the agent in block 404 by employing the UI provided by the principal's computer.

In at least one embodiment, an agent may be automatically selected for the principal. For instance, a first available agent may be automatically selected for the principal. A closest available agent may be automatically selected. Accordingly, in some embodiments, the principal may need not manually select an agent. As discussed throughout, in some embodiments, a plurality of available agents may be ranked. In at least one embodiment, the highest ranked available agent may be automatically selected at block 406. In some embodiments, the first available agent that response to a notification of the service request may be automatically selected at block 406. In at least one embodiment, the most competent or knowledgeable agent is selected. In some embodiments, at least one of the most expensive, or least expensive available agents may be selected. Such selection criteria may be based on one or more user settings within the principal's user profile.

At block 408, a communication session between the principal and the selected agent is enabled. Various embodiments of enabling a communication session between the principal and agent are discussed throughout, including but not limited to in conjunction with process 600 of FIG. 6. However, briefly, at block 408, an initial communication session may be enabled where the principal and agent communicate regarding the specifics and/or details of the requested services. If the principal and agent assent to the agent providing the requested services, a service communication session may be enabled between the principal and the agent. The service communication session may be a continuation of the initial communication session, or may be a separate communication session. The service communication session enables the agent to provide the requested services to the principal.

Accordingly, at block 408, a communication session may be provided between the principal and the agent. An availability of the agent to provide and/or perform the requested service may be based on a distance between a service location and a location of the agent. The location of the agent may be determined based on one or more signals generated by one or more GPS sensors employed by the agent.

As discussed herein, image data, such as but not limited to video data, may be generated and/or captured by one or more image sensors employed by the agent. Such image sensors include, but are not otherwise limited to one or more cameras. The principal may employ one or more gesture sensors to gesture data. As discussed herein, such gesture sensors include, but are not limited to touch-sensitive display devices or other sensors, such as accelerometers and/or gyroscopes. Such gesture data may correspond to a region of the image data.

At least a portion of the gesture data may be provided to the agent over the communication session. In at least one embodiment, a visual representation of a combination of the image data and the gesture data. In some embodiments the visual representation may include a combination of the corresponding region of the image data and the gesture data.

At decision block 410, it is determined whether another agent is to be selected to provide and/or perform the services. For instance, if at least one of the principal or the initially selected agent does not assent to the service request, another agent from the available agents may be selected. Furthermore, the principal may request additional services from other agents once the initial agent has performed the initially requested services. The combination of the image data and the gesture data may be stored in a non-transitory memory. If another agent is not to be selected, for instance if the initially selected agent has provided and completed the requested services, process 400 may terminate and/or return a calling process. If another agent is to be selected, process 400 flows to block 412.

At block 412, the agent status is updated. For instance, the initially selected agent may be removed from the available agents. Furthermore, at block 412, if a significant amount of time has passed between an earlier performance of block 404, the availability of agents may be re-determined at block 412. For instance, more (or less) agents may be available at the later time, as compared to the earlier performance of block 404. Various embodiments of determining the availability of agents within the vicinity are discussed throughout, including at least in conjunction with process 500 of FIG. 5. Process 400 returns to block 404 to provide the updated agent status to the principal.

Figure 5:
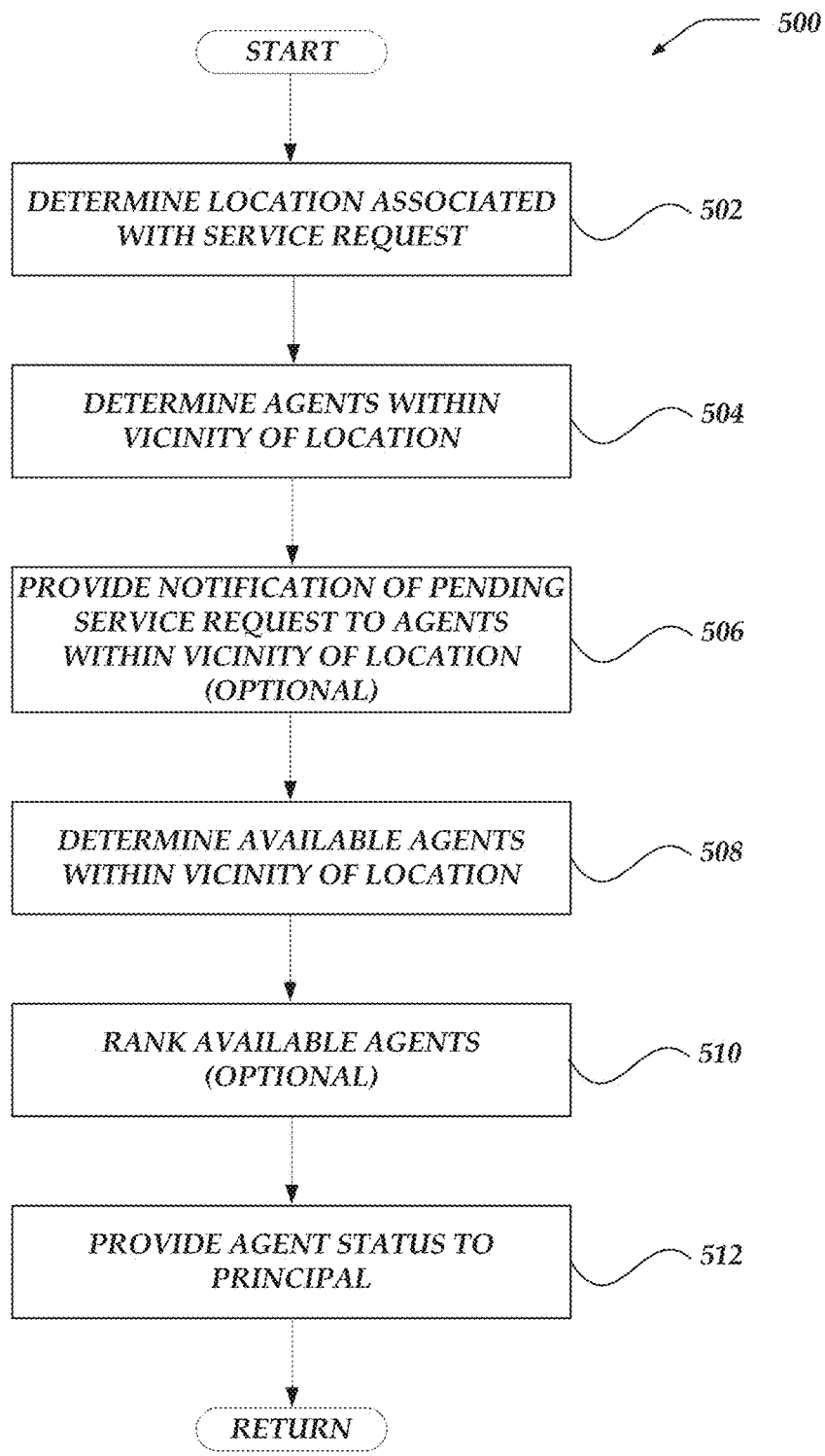
FIG. 5 shows an overview flowchart for a process to provide an agent status to a user, in accordance with at least some of the various embodiment.

FIG. 5 shows an overview flowchart for a process to provide an agent status to a user, in accordance with at least some of the various embodiments. Process 500 begins, after a start block, at block 502 where a location associated with a service request is determined. As discussed in conjunction with at least block 402, a received service request may include a service request location. The service request location may include a geo-location, or at least an approximate geo-location, as to where the requested remote services are to be provided. Accordingly, this location may be associated with the service request. As also discussed in conjunction with at least block 402, a vicinity about the location may be included with the service request. The location and/or vicinity may be determined at block 502 based on at least a query of the service request.

At block 504, one or more agents or potential agents at or near the location are determined. In at least one embodiment, one or more agents within the within the vicinity of the location are determined. More specifically, users that have been identified as agents that are within a vicinity of the location determined at block 502 are determined. A user may self-specify as an agent, a principal, or both an agent and a principal.

In some embodiments, a particular user may be identified as an agent, a principal, or both a principal and an agent, based a user profile. For instance, a user profile corresponding to the specific user may indicate that the user is a principal, agent, or a principal and an agent. A user may dynamically update their status from principal to agent, or vice versa, by updating one or more status parameters or flags within their user profile or by taking a specific declared action in the application.

Determining the agents within the vicinity of the location may be enabled by at least receiving a signal generated, at least partially by, a GPS transceiver in a computer employed be one or more agents. In some embodiments, agents may be actively logged into a platform and provide periodic updates as to their current at least approximate geo-location via a GPS generated signal. An agent may provide their current location when logging onto the platform automatically via a GPS signal, or manually entering an address, zip code, a landmark nearby, or the like. In some embodiments, an agent may periodically update their current location by automatically providing a GPS signal.

In at least one embodiment, agents that are within the vicinity of the location, but are not actively logged into the platform, may be notified, via a network message that one or more service requests are pending in a vicinity of their geo-location. For instance, Agent A, who resides in City B, may be provided a notification that service requests are pending near their residence or current location. As discussed above, an agent's current location may be determined via a GPS transceiver. A query of user profiles associated with agents may be employed to determine at least one of a current geo-location, a previous geo-location, or a likely geo-location.

At optional block 506, a notification that indicates at least a portion of the pending service request may be provided to the agent determined at block 504. For instance, the notification may be provided to agents that are not actively logged onto the platform. As such, the notification may ask the agent if they want to log onto the platform and/or be considered to perform the requested services.

In some embodiments, the notification may be provided to agents that are logged onto the platform. The notification of the service request may be provided to an agent to provide the agent an opportunity to confirm that they are indeed available and willing to perform the type of requested service. The notification may include a portion of the pending service request and may be provided by one or more network messages or notifications displayed on a UI of the agent's computer.

The provided portion of the service request may include at least the location or vicinity of the location of the requested service. The portion of the pending request may include the type of requested service. In at least one embodiment, a name or identifier of the principal that initiated or provided the service request may be included in the portion of the service request. In other embodiments, the principal may be anonymous to the agent. In some embodiments, one or more rankings, ratings, or reviews of the principal may be included in the provided portion of the service request. Such rankings, ratings, or reviews of the principal may have been generated by other agents that have previously provided services to the principal. Providing such information may enable the agent to make an informed choice regarding their availability to provide a service for the pending service request.

In at least some embodiments, further details may include at least an approximate amount of resources required to perform the services, such as time, financial resources, physical labor, or the like. Further details may include a topic, or indications of the level of competency, knowledge, or expertise in the topic, required to perform the requested services. At block 506, each agent that was provided the at least portion of the service request may be enabled to confirm their availability to provide the requested services.

Figure 8C:
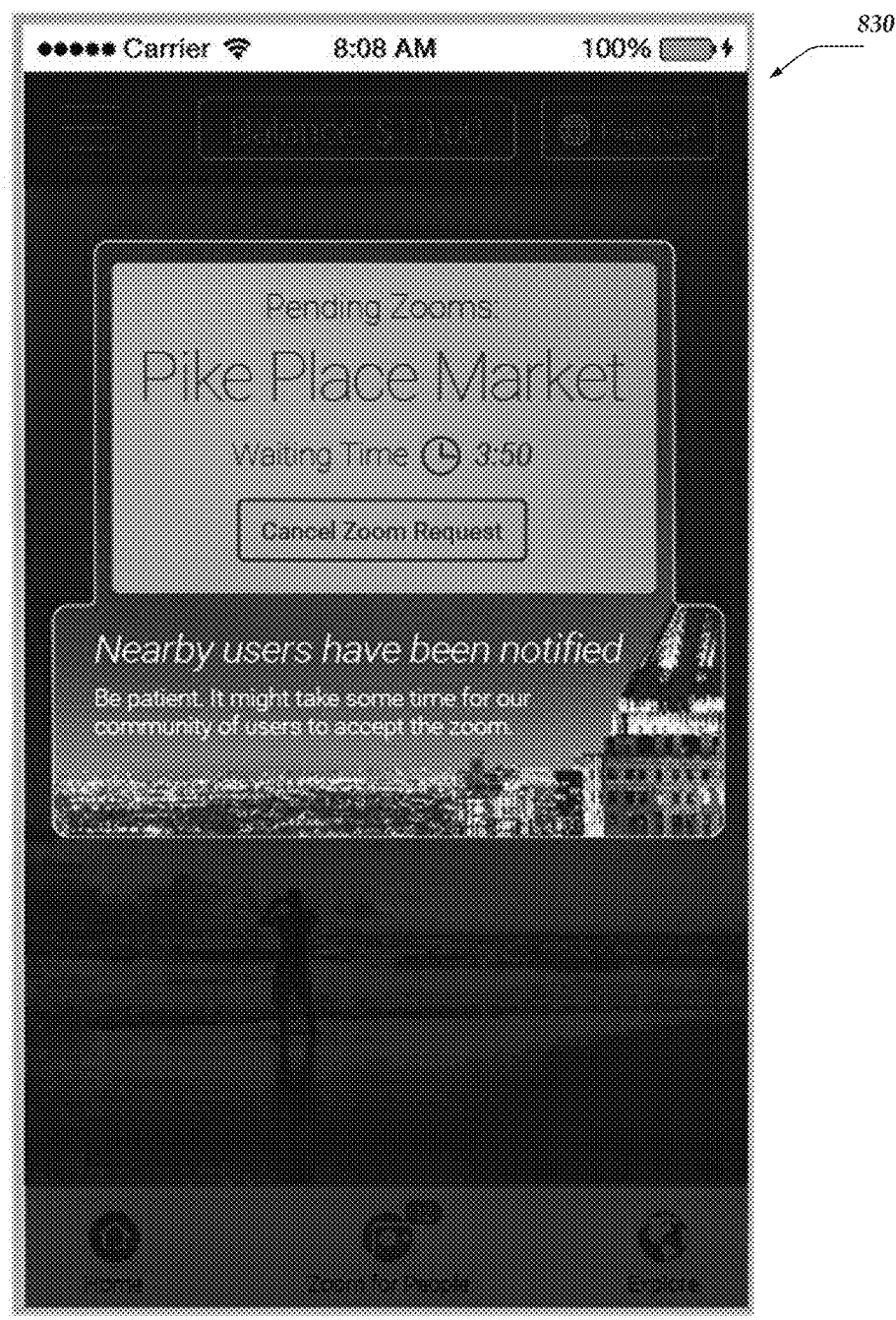
FIG. 8C illustrates a user interface that provides a principal user notification that portions of a service request have been provided to agent users, in accordance with various embodiments.

FIG. 8C illustrates a user interface that provides a principal user notification that portions of a service request have been provided to agent users, in accordance with various embodiments. View 830 of FIG. 8C illustrates a notification provided to the principal that agents within a vicinity of the service location have been provided at least portions of the pending service request, or Zoom request. The principal is enabled to cancel the service request by interacting with the UI.

At block 508, the available agents within the vicinity of the location are determined. Accordingly, at block 508, one or more subsets of the agents determined at block 504 are determined. An agent may provide their current availability by updating one or more availability parameters. For instance, an agent may update an availability parameter or flag within their user profile to indicate that they are current available to perform services requested by one or more principals. When an agent signs into the platform, the agent may indicate they are available to perform services. When an agent signs or logs into the platform, the agent may automatically be indicted as available, unless the agent overrides the default availability.

Determining the available agents within the vicinity may be based on at least a portion of the agents within the vicinity confirming their availability, as discussed in at least conjunction with block 506. For instance, when an agent is provided a notification of a service request associated with a nearby location, the agent may employ the UI to confirm that they are available.

In at least one embodiment, a competency or enablement of each of the available agents is determined. For instance, at block 508, one or more subsets of available agents that are competent to perform the requested service are determined. For instance, if the requested service requires specialized knowledge, skill, or expertise, such as a request for instruction of information, the subset of competent agents within the set of available agents may be determined at block 508. In some embodiments, where the location of the agent is moot during the performance of the requested services, at least portions of blocks 502-506 may not be required for process 600.

At optional block 510, the available (and competent) agents determined at block 508 may be ranked. The available agents may be ranked via a physical distance from the location. For instance, the available agent that is closest to the location associated with the service request may be at the top of the ranking of available agents. In some embodiments, the agent may be ranked via concentric circles, where the location associated with the service request is at the center of the concentric circles. Agents are ranked via the most innermost of the concentric circles that they are located within.

In some embodiments, the innermost concentric circle includes a first predetermined radius. Each of the agents within the area defined by the innermost concentric circle are included near the top of the ranking. The next innermost circle may include a second predetermined radius that is larger than the first predetermined radius. Agents within this circle but not within the most innermost circle appear below the agents within the innermost circle within the ranking of agents.

In at least one embodiment, the available agents are ranked via one or more user ratings, reviews or relative rankings provided by other principals that have received services previously provided by the agent. In some embodiments, the ranking may be based on one or more credentials, knowledge assessments, or the like, of the topic of the requested service. For instance, experts may be ranked above agents that are only competent, with regards to the performance, or required knowledge for the performance, of the services.

In some embodiments, the rakings may be based on a cost or fee associated with each of available agents. For instance, agents may require a fee to perform the requested services. In some embodiments, the agents may be ranked based on the fee. Agents may be ranked from most expensive fee to least expense fee, or vice versa. A principal may apply various filters and/or ranking criteria to the ranking of the available agents. For instance, the principal may define the desired criteria for ranking the available agents by employing one or more flags, settings, or parameters within their user profile. Furthermore, the principal may filter on the cost or fee associated with the agents. A user may apply such ranking criteria and filters by employing the UI provided by the principal's computer.

At block 512, an agent status is provided to the principal. The agent status may be provided to the principal via one or more UI on the principal's computer. Providing the agent status may include providing at least an indication of at least a portion the available agents determined at block 508.

As such, the agent status provided to the principal may include at least references, links, icons, or the like that correspond to one or more of the agents within the vicinity of the requested location that are available and competent to provide the requested service type. For instance, an interactive map may be provided to the principal, via a UI, where at least an approximate geo-location of each available agent is shown via an icon, such as but not limited to a pin icon. The location of the requested service may also be shown on the interactive map with another icon, so that the principal may visually review at least an approximate distance between each of the available agents and the location of the requested service.

In some embodiments, where the available agents are ranked at optional block 510, at least a portion of the ranking of the available agents may be provided to the principal. For example, an indication of the five highest ranked available agents are provided to the principal. In some embodiments, a ranked list of the available agents may be provided to the principal. In some embodiments, at least an approximation of the ranking may be provided visually to the principal via a color-coding of the icons or pins of the available agents on the interactive map.

In at least one embodiment, an agent may be automatically selected and provided to the principal at block 512. The automatic selection of an agent may be based on at least one of an availability, competency, location, ranking, or the like.

Figure 6:
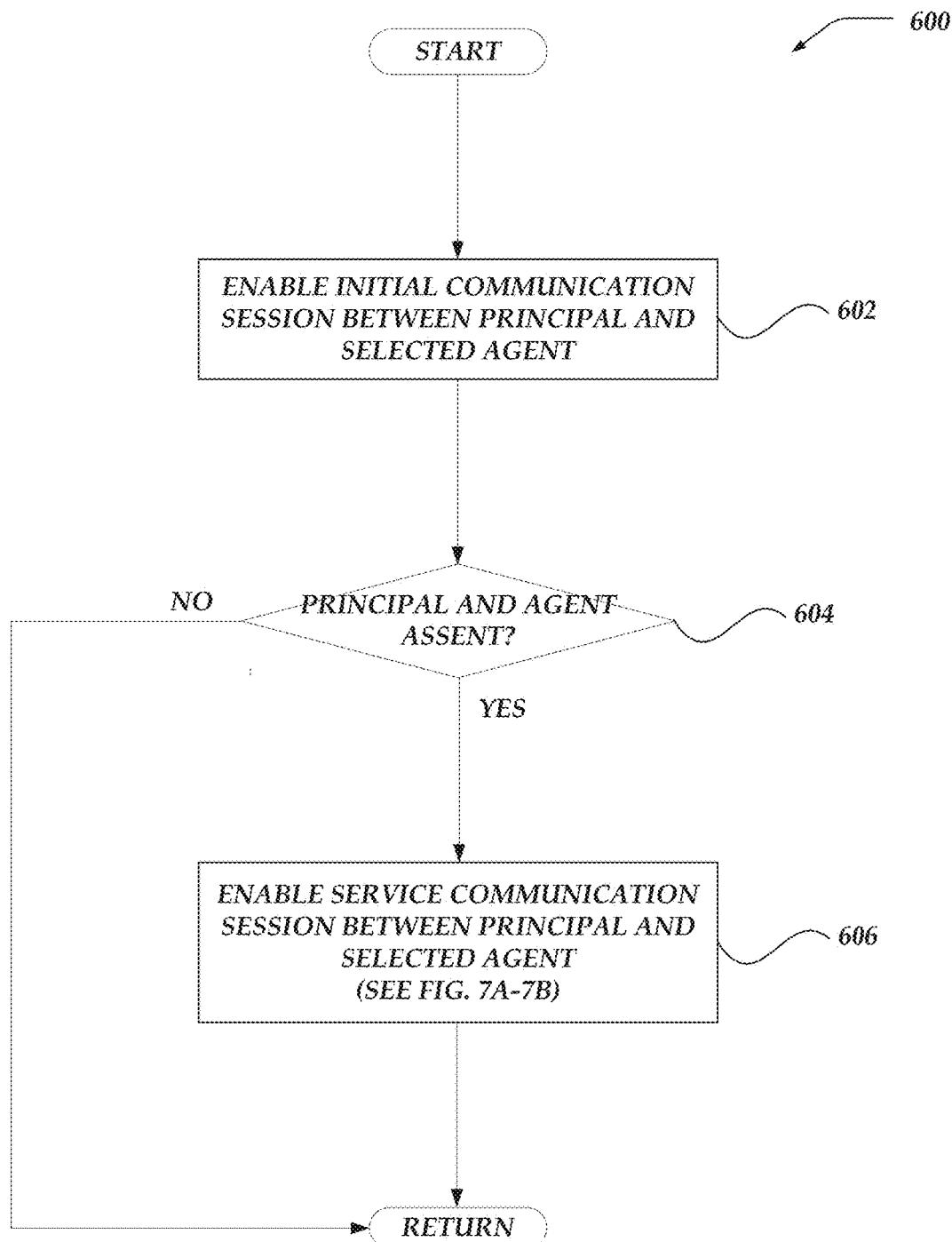
FIG. 6 shows an overview flowchart for a process to enable a communication session between a principal and an agent, in accordance with at least some of the various embodiment.

FIG. 6 shows an overview flowchart for a process to enable a communication session between a principal and an agent, in accordance with at least some of the various embodiments. For instance, process 600 may be employed to enable a communication session between a principal and a (automatically or manually) selected agent. The principal may have provided a service request, such as but not otherwise limited to the discussion in conjunction with at least block 402 of process 400 of FIG. 4. The agent may have been selected during block 406 of process 400. Each of the principal and the selected agent may participate in the communication session by employing one or more computers. One or more user interfaces (UIs) may be employed to further enable the communication session.

A communication session may be established that enables the selected agent to at least partially provide the remote service to the principal. During a communication session, each of the principal and agent may capture, generate, provide, transmit, receive, communicate, or otherwise exchange communication session (CS) data. The CS data may be communicated, to at least one of the principal or agent in real-time, or at least near real-time, over the communication session. In at least one embodiment, each of the principal and agent may be enabled to generate and/or capture CS data and provide the other party a CS data stream in real-time or near real time, such that the communication session is a bi-directional communication session. In such embodiments, at least a portion of the CS data captured and/or generated by the principal/agent may be provided to the other party. In at least one embodiment of a bi-directional communication session, the entirety of the CS data stream may be provided to the other party.

Figure 12:
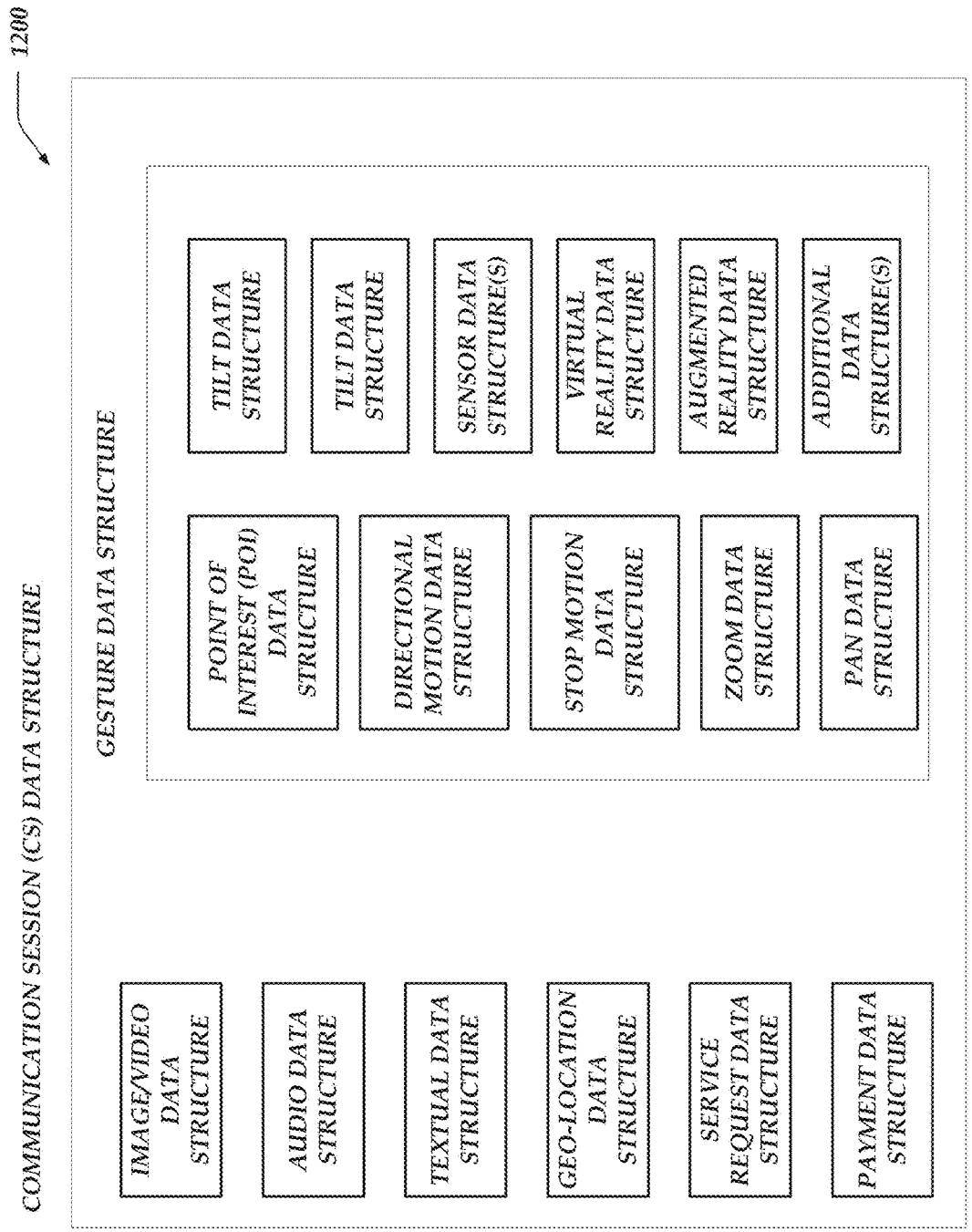
FIG. 12 shows an, but non-limiting, embodiment of a communication session data structure.

As discussed throughout, any of the CS data, including but not limited to image/video data, textual data, audio data, gesture data, augmented reality (AR) data, virtual reality (VR) data, sensor data, or the like may be structured data and/or be included in one or more data structures. For instance, CS data may be structured as a CS data structure. The CS data structure may be transmitted by the communication session in a CS data structure stream. FIG. 12 shows an, but non-limiting, embodiment of a communication session data structure 1200. As shown, CS data structure 1200 may include other data structures, such as but not limited to image/video data structures, directional motion data structures, and the like. CS data structure 1200 may be transmitted via the communication session and stored in a transitory or a non-transitory storage media. It should be understood that CS data structure 1200 may include more or less data, components, data structures, or sub-data structures. Other embodiments of data structures may be implemented within various embodiments. A display of a user's computer may be updated and/or modified based on a CS data structure.

Process 600 begins after a start block, at block 602 where an initial communication session between the principle and the selected agent is enabled. The initial communication session may include a chat room and/or chat session. In the initial communication session, the principal and the agent may be enabled to generate and/or capture image data, as well as provide, receive, or otherwise communicate other CS data, including but not limited to at least one of audio, textual, and/or graphical CS data. In the initial communication session, the principal and agent may be enabled to communicate further details regarding the requested services that may not have been included in the initial service request. For instance, in the initial communication session, the principal and the agent may finalize any requirements associated with the performance of the requested services, such as but not limited to required fees, or the like.

At decision block 604, it is determined whether the at least one of the principal and agent have assented. For instance, if the agent provides an indication, within the initial communication session, that the agent agrees to provide the requested services, process 600 flows to block 606. An agent and/or principal may assent by providing an indication that they are ready to initiate the service communication session. Otherwise, process 600 may terminate and/or return. In such embodiments, the principal may be enabled to select another available agent.

At block 606, a service communication session between the principal and the selected agent is enabled. Various embodiments of enabling a service communication session are discussed throughout, including at least but not limited in conjunction with at least processes 700 and 750 of FIGS. 7A-7B. However, briefly, the service communication session may be a continuation of the initial communication session, or may be a separate communication session. The service communication session enables the agent to at least partially provide the requested services to the principal.

In at least one but non-limiting embodiment, during the service communication session, the agent is enabled to capture and/or generate image data that includes at least one of video or audio data. In real-time, the agent may provide the video data to the principal via the communication session. Each of the agent and principal may be further enabled to generate and/or capture textual and/or audio data that is provided to the other party. In at least one embodiment, the textual data may be transformed and/or translated based on a language preference associated with each of the principal and agent. For instance, if the principal is an English speaker, but the agent is a Cantonese speaker, the textual CS data generated (in English) by the principal may be automatically transformed, translated, or otherwise localized into the corresponding Cantonese textual data prior to it being provided to the agent. In at least one embodiment, audio data may be automatically translated, transformed, and/or localized via a similar process. In various embodiments, at least portions of the provided CS data may be automatically localized, with regards to at least one of the principal and/or agent based on a geo-location or a user preference of the user.

The principal may employ their computer device to view and/or review the provided image data in real-time. To provide the agent direction, the principal may generate gesture data. As discussed throughout, gesture data may include any CS data that is employed to direct the agent in the performance of the services. Gesture data may include various types of metadata that correspond to at least regions or portions of the image data.

As described herein, such gesture data may be generated by the principal employing a UI of the communication session. Such gesture data is blended, overlaid, or otherwise combined with the other CS data, and provided to the agent in real-time via the communication data. Such a combining of the gesture data with the other provided CS data provides the agent visual, audible, graphical, or textual cues as to the performance of the requested services.

Such gesture data may include graphical data to direct the agent in the performance of the services. For instance, the gesture data may be employed to indicate a point of interest for the agent to focus on, directional movement, to stop or progress in movement, a relative speed of the movement, zoom in/zoom out, and the like. In addition to graphical overlays or graphical blends, gesture data may include audio and/or textual data to provide further and/or additional indications, instructions, and the like for the agent's performance. After the service communication session is terminated by at least one of the principal and/or agent, process 600 may terminate and/or return a calling process.

Figure 7A:
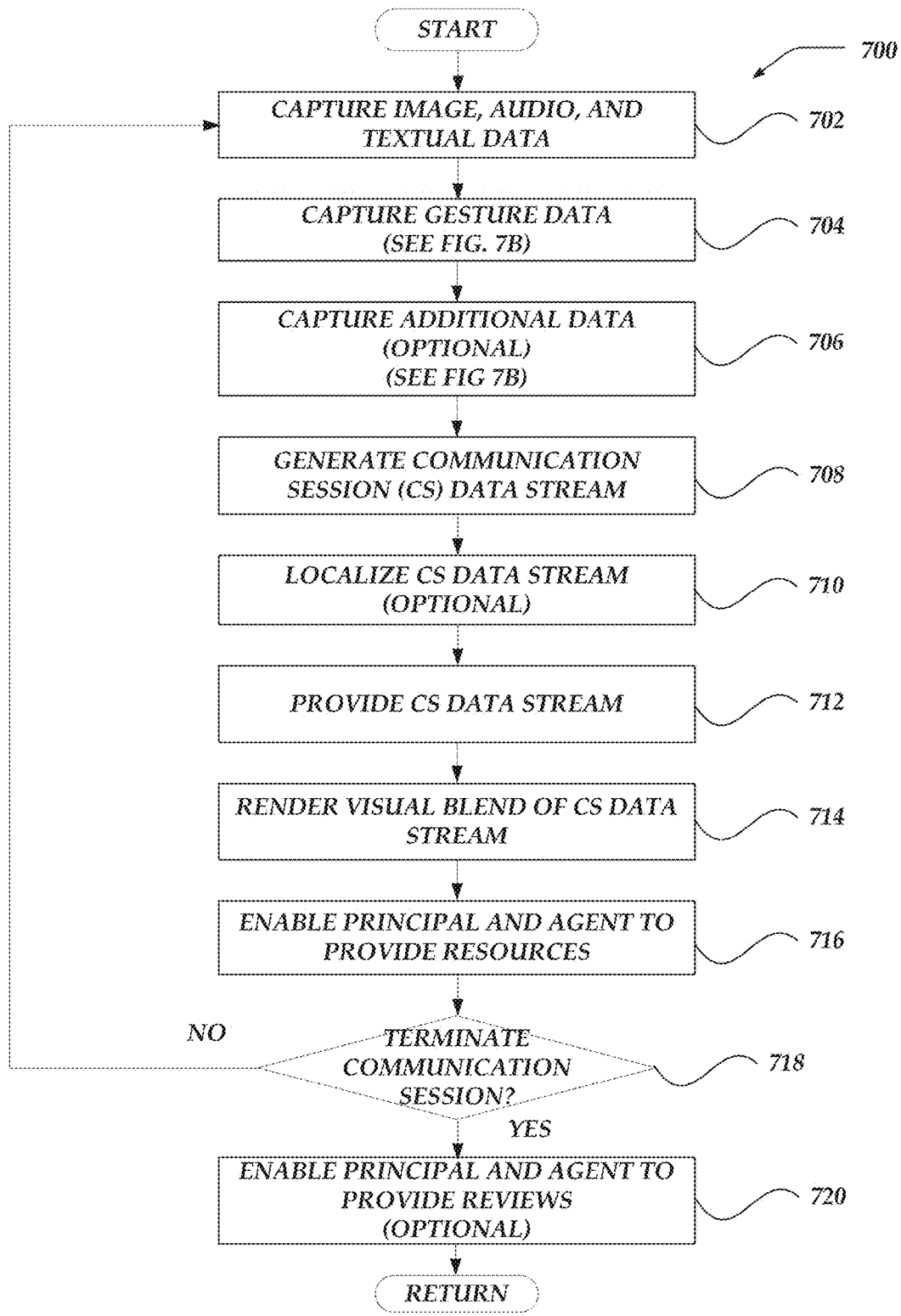
FIG. 7A shows an overview flowchart for a process to enable a service communication session between a principal and an agent, in accordance with at least some of the various embodiment.

FIG. 7A shows an overview flowchart for a process to enable a service communication session between a principal and an agent, in accordance with at least some of the various embodiment. In various embodiments, the communication session may include one or more peer-to-peer (P2P) network connections. In other embodiments, the communication session may include network connections that employ a client-server model. In such embodiments, one or more communication session servers or communication session engines may be intermediate and/or serve one or more communication session clients employed by the principal and agent.

Figure 7B:
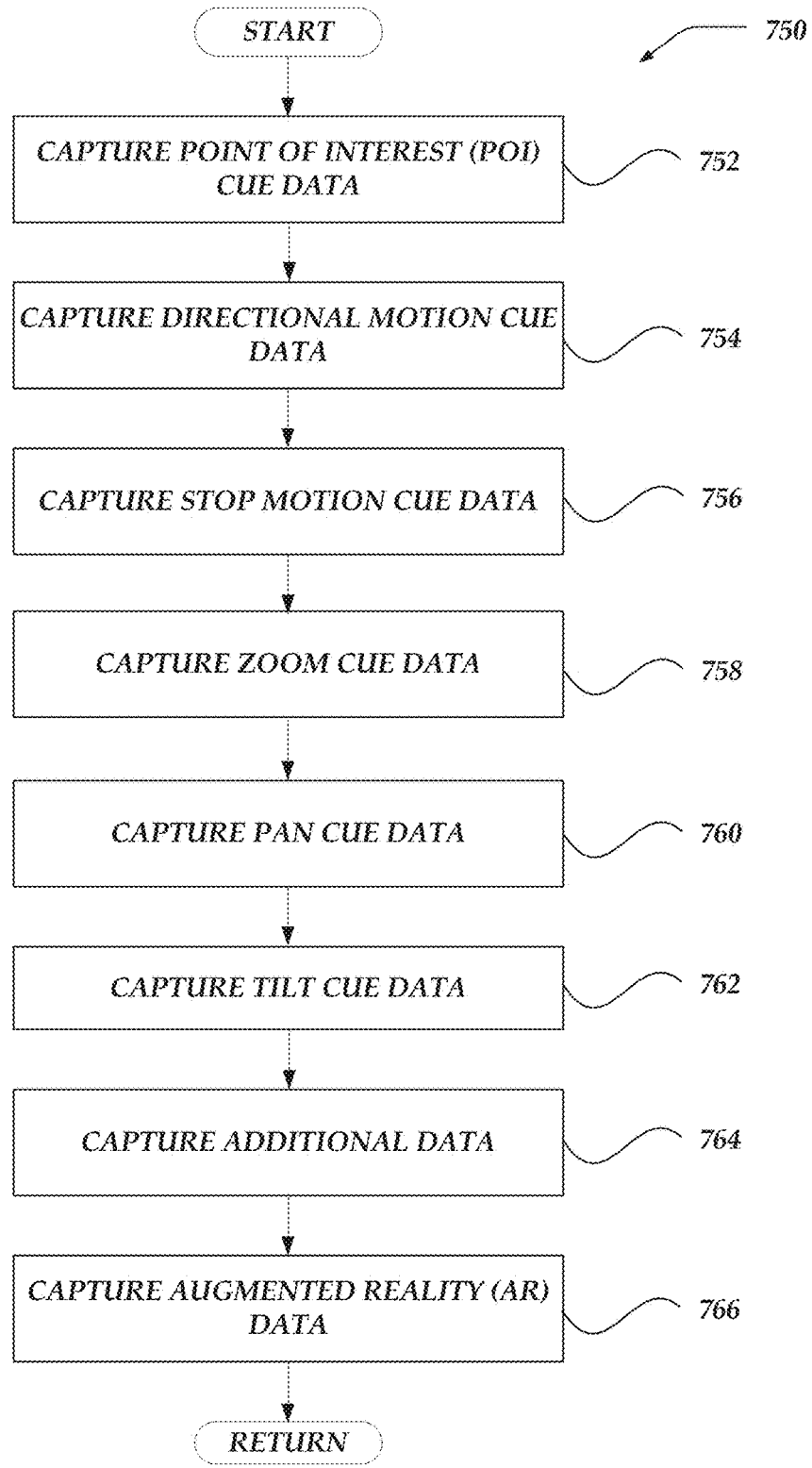
FIG. 7B shows an overview flowchart for a process to capture gesture, locational, positional, attitudinal, and orientation data, in accordance with at least some of the various embodiment.

In the context of at least processes 700 and 750 of FIG. 7B, and because the communication session may be a bi-directional communication session, each of the principal and/or agent may capture and/or generate the CS data, as discussed herein. In various embodiments, one or more computers employed by the principal or the agent, captures and/or generates the CS data, including but not limited to image data, audio data, textual data, gesture data, wearable sensor data, augmented reality (AR) data, and the like. For instance, the principal may generate and/or capture CS data and provide the CS data to the agent in real-time, or near real-time, via the communication session. Similarly, the agent may generate and/or capture CS data and provide the CS data to the principal in real-time, via the communication session. Accordingly, in conjunction with the discussion of at least FIGS. 7A and 7B, at least portions of the processes may be performed by either the principal, agent, or both, as well as various computers employed by the principal, agent, or both, Process 700 begins, after a start block, at block 702 where at least one of image data, audio data, or textual data is captured. In various embodiments, one or more computers used by the principal or agents, captures and/or generates image data, audio data, and/or textual data. Each of the principal and the agent may capture and/or generate at least one of image data, audio data, and textual data at block 702. As discussed throughout, each of the principal and the agent may capture and/or generate such CS data and provide the data to the other party, via a CS data stream transmitted in the communication session.

At block 704, gesture data is captured. Various embodiments for capturing and/or generating capture data is discussed in conjunction with at least process 750 of FIG. 7B. However, briefly, in some embodiments, a user, such but not limited to the principal, may employ a computer to generate gesture data. Such gesture data may be provided to another user, such as but not limited to a selected agent. Accordingly, the gesture data may be included, blended, or otherwise combined with the other CS data that is to be provided to the agent, such as but not limited to the image data, audio data, or textual data captures at block 702.

As discussed throughout, any of the gesture data may be structured data and/or be included in one or more data structures. For instance, gesture data may be structured as a gesture data structure. A gesture data structure may be included in, be a component of, or otherwise be embedded within a CS data structure. The gesture data structure may be transmitted by the communication session in a CS data structure stream.

When rendered, either visually or audibly on the agent's computer, the gesture data provides cues and/or direction to the agent, in regards to the agent's performance of the requested services. For instance, the gesture data may provide visual cues to the agent as to how to carry out their performance. Gesture data may include, but is not limited to, at least one or more of point of interest (POI) cue data, directional motion cue data, stop motion cue data, zoom in/out cue data, pan cue data, tilt cue data, and the like.

At optional block 706, additional data may be captured and/or generated. Various embodiments of capturing other data are discussed in the context of process of at least 750 of FIG. 7B. However briefly, additional data may include but is not otherwise limited to augmented reality (AR) data, sensor data, and the like. The sensor data may include wearable sensor data. For instance, at least one of the agent or the principal one or more other additional sensors. Such additional sensors may include accelerometers, temperature sensors, barometric sensors, light sensors, biometric sensors, such as heartrate monitors, and the like. At least a portion of these sensors may be wearable. Such wearable devices may include a pedometer, a smartwatch, headwear headset, or eyeglasses, such as a virtual reality (VR) or AR headset, and the like. Any portion of this additional data may be included in the CS data stream and provided to the other party.

At block 708, a CS data stream is generated. The generated CS data stream may include at least portions of the data captured and/or generated image data at blocks 702-706, including but not limited to audio data, textual data, gesture data, sensor data, AR data, and the like. Thus, at least portions of the image data, audio data, textual data, gesture data, AR data, sensor data, and the like may be blended, or otherwise combined to generate the CS data stream. As such, the CS data stream may be a mixed data-type stream, or include multiple types of data. The data in the CS data stream may be structured or unstructured data. For instance, the CS data stream may include one or more CS data structures. A CS data structure may include one or more image data structures, audio data structures, textual data structures, gesture data structures, or the like.

At optional block 710, at least a portion of the CS data stream may be localized, transformed, and/or translated. In one embodiment, language-based portions of the CS data stream may be automatically localized, or at least translated, based on a preferred language, a geo-location, or other factors based on the principal's and/or agent's user preferences, geo-locations, or the like. Such a localization may include, but is not otherwise limited to an automatic transformation or translation of at least portions of the CS data stream to customize the linguistics, technical parameters, time zones, configuration parameters, units of measurement, monetary units, units applied to sensor data, calibration applied to sensor data, and the like based on a user preference, or geo-location of the principal and/or agent.

In at least one, but non-limiting, embodiment, the textual data may be automatically translated based on a language preference associated with each of the principal and agent. For instance, if the principal is an English speaker, but the agent is a Cantonese speaker, the textual CS data generated (in English) by the principal may be automatically transformed and/or translated into the corresponding Cantonese textual data prior to it being provided to the agent. Monetary or currency units, time zones, linguistics, colloquiums, and other such aspects may also be automatically transformed back and forth between the principal and the agent. In at least one embodiment, audio data may be automatically translated and/or transformed via a similar process.

A language preference may be included in the user profile for each particular user. In at least one embodiment, a signal generated by a GPS transceiver may be automatically employed to localize portions of the CS data stream for each of the principal and the agent.

At block 712, the CS data stream is provided to at least one of the principal and/or agent participating in the communication session. Accordingly, the CS data stream may be transmitted at block 712. The CS data steam may be provided to at least one of the principal or the agent via the communication session. For instance, the agent may transmit at least a portion of the image data captured in the performance of their videography service. The principal may receive the transmitted image data at block 712. Each of the parties may be enabled to store and/or archive at least portions of the CS data stream in non-transitory computer readable media for later review. Likewise, CS data captured and/or generated by the principal's computer may be provided to the agent in real-time, or near real-time.

Various stream arbitration methods or processes may be employed to enable the efficient transmitting and receiving of the CS data stream. In various embodiments, a bit-rate of the provided CS data stream may be automatically and/or dynamically varied based on an available network bandwidth resource associated with at least one of the principal or agent. For instance, a resolution of the transmitted image data may be dynamically varied based on the agent's available network bandwidth. Additionally, in one or more embodiments, a principal may select a resolution that the agent employs for the communication session. For example, a relatively low resolution may be selected to reduce the bandwidth and cost of the communication session. Or a highest resolution available could be selected for the entire communication session or only when the principal identifies a particular view of interest to the agent. In one or more embodiments, a cost for the communication session to the principal could vary based on the resolution/bandwidth that is selected. In one or more of the various embodiments, when there are few if any Agents currently available, the Principal can choose to offer an extra incentive, such as a credit, attribution, or financial benefit, to an Agent that chooses to participate in a communication session with the Principal. Also, in one or more embodiments, when there are few if an Agents currently available, an available Agent can choose to ask for an extra incentive, such as a credit, attribution, or financial benefit, from a Principal as a precondition to agree to participate in a communication session. Moreover, the Principal can provide an acknowledgment to the Agent for a successful completion of a communication session, such as a credit, attribution, or financial benefit.

In at least some embodiments, one or more re-connect processes or methods may be employed to re-establish or re-enable the communication session when the communication session is unexpectedly interrupted, lost, or otherwise unexpectedly terminated. For instance, if the communication session is unexpectedly terminated due to the intermittent availability of network resources, the communication session may be gracefully re-established when the network resources become available again. In one or more embodiment, the re-connect process can buffer the CS data stream provided by the Agent until a predetermined bandwidth is re-established for the communication session. Then, the re-connect process can enable the Principal's UI to begin communication again between the Principal and Agent over the communication session.

At block 714, at least a portion of the CS data stream is visually rendered on a display device. The CS data stream may be visually rendered on or by one the display devices of each of the principal's and agent's computers in real-time. In some embodiments, at least a portion of the gesture data is visually rendered, as visual cues on the display device. The visual cues may be blended, overlaid, or otherwise combined with at least the image data portion of the CS data stream. Such a combining of the visual cues with the image data provides the agent visual, audible, graphical, or textual cues as to the performance of the requested services. In some embodiments, at least portions of the image data with the overlaid or blended gesture data is displayed on each of the principal's and agent's computers in real time, as the image data and the gesture data is being captured and provided.

At block 716, at least one of the principal or agent is enabled to provide resources to the other party. For instance, the principal may be enabled to transmit, or otherwise provide financial assets, such as a currency and/or monetary units to the agent for their services. Such resources may include virtual and/or digital currency. The virtual and/or digital currency may be a decentralized currency.

Various embodiments may include a wallet function, where contents included in a virtual wallet or account of the principal may be transmitted or otherwise provided to the agent (or vice versa). In various embodiments, the principal may be enabled to provide financial compensation for the agent's services. In at least one embodiment, the principal may provide the agent a specified amount of currency in the event that the performed service requires the purchasing of an item, gaining access to any event, or donating or otherwise providing money to a remote party.

In some embodiments, an automatic currency exchange may be performed based on at least preferences, or locations of the principal and the agent. As discussed throughout, a localization of the currency may be automatically enabled in various embodiments via a signal generated from one or more GPS transceivers or one or more user preferences included in one or more parameters, settings, or flags in one or more user profiles.

At decision block 718, it is determined whether to terminate the communication session. In various embodiments, at least one of the principal or agent may be enabled to terminate the communication session by employing an UI. If the communication session is not to be terminated, process 700 returns to block 702 to continue capturing at least one of image, audio, or textual data. If the communication session is terminated by at least one of the principal or the agent, process 700 may flow to optional block 720. In other embodiments, where optional block 700 is not performed, process 700 may terminate and/or return a calling process.

At optional block 720, at least one of the principal or agent may be enabled to provide one or more reviews of the other party. The review may include one or more absolute or relative numerical scores, metrics, ratings, and/or rankings. The reviews may include textual and/or audio data. For instance, the principal may be enabled to provide an overall score for the agent based on the agent's performance of the requested services. The principal may be enabled to provide one or more scores or metrics based on the agent's knowledge, competency, or expertise in a topic when providing information or instruction of the topic. In some embodiments, the principal may provide a review of the agent's willingness to be directed by or follow the provided gesture data while performing the service. In some embodiments, the agent may provide one or more reviews based on a principal's performance of providing resources at block 716. For instance, an agent may score the principal based on a financial tip provided to the agent for the agent's services.

The reviews may be accessed by other users in the future. For instance, another principal may access reviews for one or more agents when deciding whether to assent to the agent providing the requested services. Likewise, subsequent agents may access and/or review one or more reviews for a particular principal when deciding whether to respond to a service request. In some embodiments, the reviews may be provided to the subject of the reviews, i.e. the reviewed agent and/or principal. In other embodiments, the reviews may remain anonymous to the reviewed subject. Process 700 may terminate and/or return a calling process.

Some embodiments may include at least one of a "Block Principal" or a "Block Agent" feature. For instance, a principal who is dissatisfied with an agent's performance may block or flag that particular agent from future opportunities to perform futures services for the principal. In such cases, when the principal provides subsequent service requests, the particular blocked agent is not considered as an available agent. Similarly, an agent may block a principal. When an agent has blocked a principal, the agent will not be considered available for subsequent services requests by the principal. In some embodiments, when a principal and/or agent has been blocked by a threshold number of other users, the frequently blocked principal or agent may be denied future access to the platform. In at least one embodiment, such a frequently blocked user may have their user privileges temporarily, or event permanently, revoked.

FIG. 7B shows an overview flowchart for a process to capture gesture, locational, positional, attitudinal, and orientation data, in accordance with at least some of the various embodiment. As discussed throughout, at least portions of the gesture data may be rendered visually, on each of the agent's and principal's display device in real-time, or near real-time. Such a visual rendering of the gesture data may provide the user that generates the gesture data visual feedback as to what the guidance the user is providing to the other user. Furthermore, the visual rendering of the gesture data on the other user's display device provides visual guidance.

In various embodiments, gesture data may be captured and/or generated by one or more gesture sensors employed by at least one of the principal or agent. Gesture sensors may sense physical gestures, movement, motion, or the like of a user. For instance, a gesture sensor may include, but is not otherwise limited to one or more touch-sensitive display devices, a touch interface, such as touch interface 244 of mobile computer 200 of FIG. 2, a keypad, such as keypad 252 of FIG. 2, an open air gesture interface, such as but not limited to open air gesture interface 260, and the like. A gesture sensor may include one or more accelerometers and/or one or more gyroscopes. One or more gesture sensors may be included in one or more wearable devices.

Although in various embodiments discussed herein, the principal may be generating gesture data to guide and/or direct the agent's performance, other embodiments are not so constrained. For instance, the agent may also generate gesture data to be provided to the principal. In at least one embodiment, during the communication session, the agent's and the principal's display device are simultaneously displaying at least a portion of substantially equivalent CS data, including at least the image data the gestures data that is overlaid, blended, or otherwise combined with the image data. In at least some embodiments, the visual rendering of the gesture data and the image data may be substantially equivalent for the principal and the agent. In other embodiments, the visual rendering for the principal may include differences, with respect to the visual rendering for the agent. Any of the gesture data discussed herein may be included in one or more data structures, such as but not limited to one or more gesture data structures.

Process 750 begins, after a start block, at block 752 where point of interest (POI) cue data is captured. When visually rendered on a display device, POI cue data may provide a user direction to focus videography services on a POI. In various embodiments, a principal may identify a POI by a single finger tap in the region of the display device that displays the POI. Such a finger tap may provide a visual cue by highlighting the section of the display device that includes the POI. As discussed throughout, the highlight may be rendered visually in real-time or near real-time, on at least one of the agent's and the principal's display device.

At block 754, directional motion cue data may be captured. When visually rendered on a user's display device, the directional motion cue data may provide a visual cue as to a direction and/or speed for the user to move. For instance, a principal may swipe one or more fingers across their display device to indicate a direction for the agent to follow. When swiping, a directional arrow, vector, or other such directional indications and/or icons may be animated, or otherwise visually rendered on at least one of the user's display device. Accordingly, the agent may follow the arrow shown on their display device when performing the services. The length of the vector may indicate a relative speed for the agent's movement. For instance, a longer arrow may indicate for the agent to run in the corresponding direction, while a shorter arrow may indicate for the agent to walk slowly in the direction.

Figure 9A:
FIG. 9A illustrates a user interface that displays a visual combination of textual data, image data, and directional motion cue data.
Figure 9B:
FIG. 9B shows various embodiments of combinations of textual data, image data, and stop motion cue data.
Figure 9B:
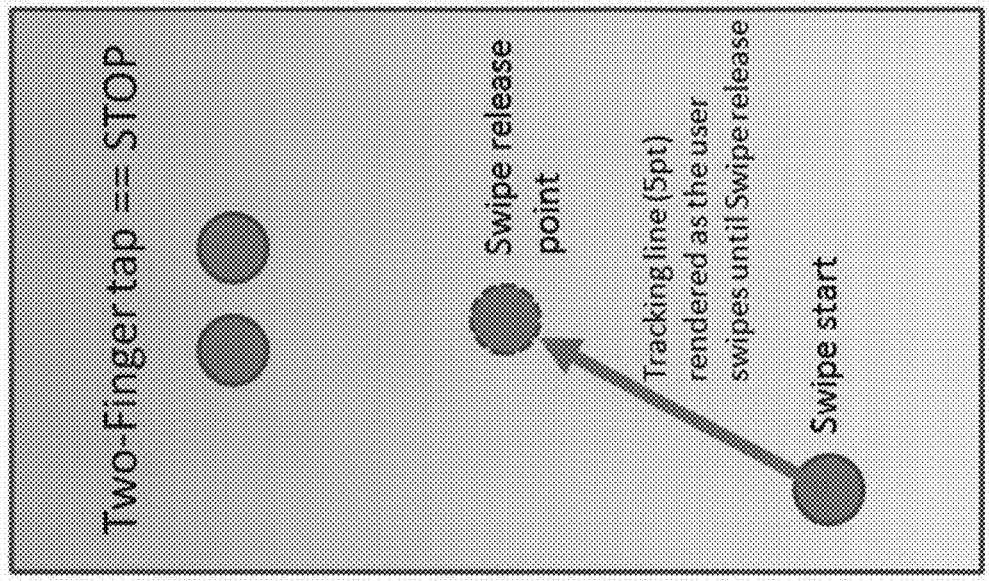

For example, FIG. 9A illustrates a user interface that displays a visually rendered combination of textual data, image data, and directional motion cue data. In view 900 of the UI, a principal has provided the directional motion cue data via swiping on a touch-sensitive display device. View 910 of FIG. 9B shows one embodiment of such a swiping gesture. A curved dotted arrow indicating the direction of the swipe is blended or overlaid on the image data. The last few entries of textual data exchanged between the principal and the agent is shown also overlaid the image data. Accordingly, through the UI, the agent is provided a visual indication of where to move, via the principal's gesture data, in real-time or near real-time, while performing videography services for the principal.

At block 756, one or more stop motion cues may be captured. When visually rendered on a user's display device, the stop motion cue data may provide a visual cue for the user to cease or stop movement. For instance, a principal may provide a two-finger tap on their display device to indicate the agent to stop movement. A stop sign, a hand, or other such visual indication may be rendered on each of the user's display device.

FIG. 9B illustrates a user interface that displays a visual combination of textual data, image data, and stop motion cue data. View 910 of FIG. 9B shows the gestures on a touch-sensitive display device that will generate stop motion cue data (two-finger tap) and directional motion cue data (swipe start and release). In view 920 of the UI, a principal has provided the stop motion cue data via the two-finger tap shown in view 910. A hand circumscribed by a circle, indicating to stop motion is blended or overlaid on the image data. As shown in view 920, in at least some embodiments, when a stop motion visual indication is provided, at least the image data shown in the UI is deemphasized, has less color or illumination, or is grayscaled. Accordingly, the agent is provided a visual indication to stop moving, via the principal's gesture data. In at least some embodiments, the video services may be paused, in that the image data shown on the display device when the stop motion cue data is generated is paused.

At block 758, zoom cue data may be captured. When visually rendered on a user's display device, the zoom cue data may provide a visual cue for the user to get closer or back away from a region within the field of view of the image data. For instance, a principal may pinch within a region of their touch-sensitive display device to indicate the agent to move towards the corresponding physical region shown in the region of image data. Likewise, the principal may reverse-pinch within a region of their touch-sensitive display device to indicate the agent to back away from the corresponding physical region shown in the region of image data. In at least some embodiments, the zoom in and zoom out cue data may indicate for an agent to zoom in or zoom out the focus of their image sensor device.

Figure 10:
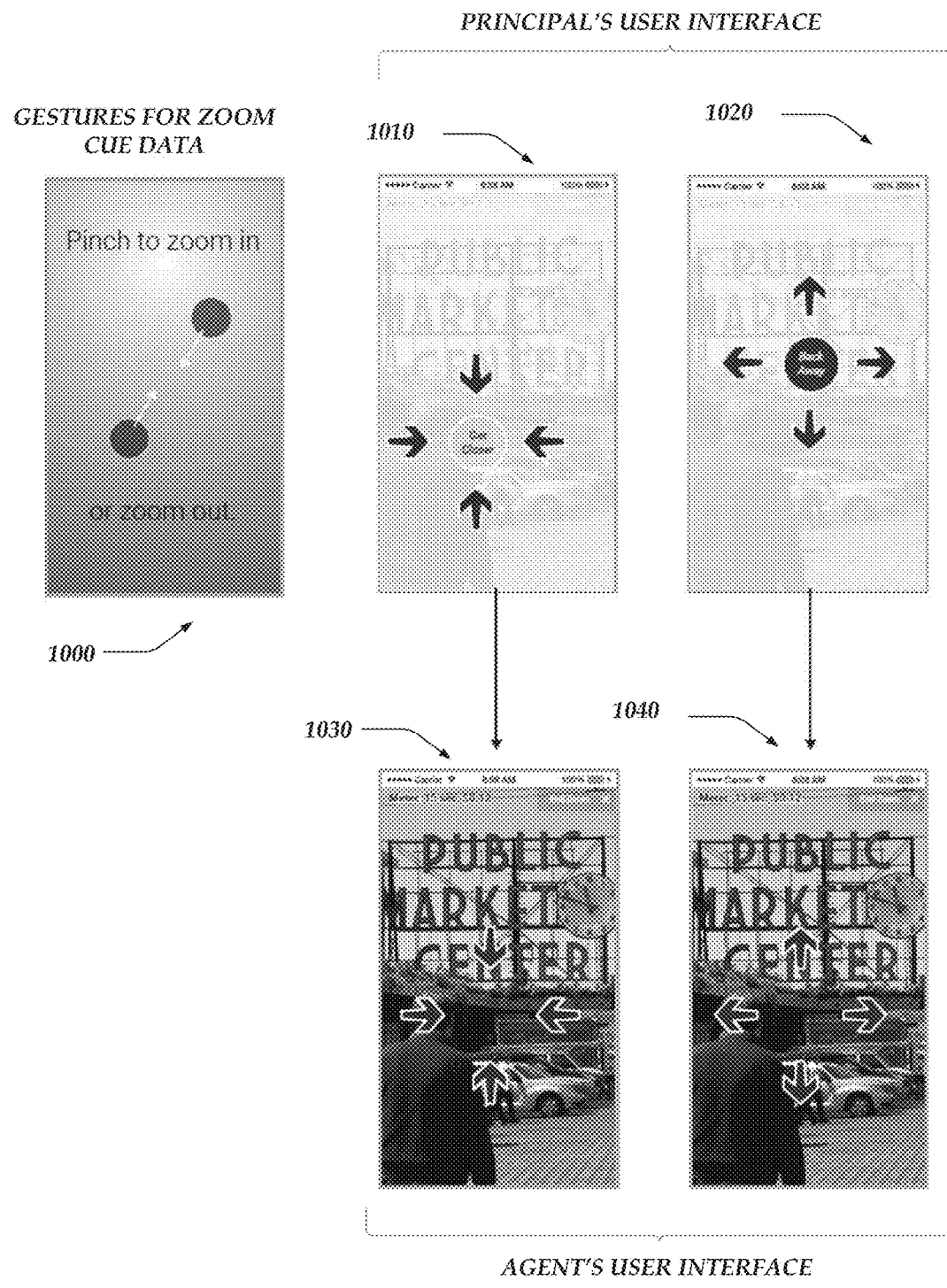
FIG. 10 shows various embodiments of a visual combination of image data and zoom cue data rendered on a display device.

FIG. 10 shows various embodiments of visual blending of textual data, image data, and zoom cue data rendered on a display device. View 1010 shows a visual combination of image data and zoom cue data rendered by a UI employed by a principal. For instance, a principal may have pinched in a region of their display device. Inward pointing arrows and a "Get Closer" icon may be blended and/or overlaid on the image data of the particular region. View 1030 shows another embodiment of a visual combination of image data and zoom cue data rendered by a UI employed by an agent. Note that, as shown in at least views 1010 and 1030, at least in some embodiments, the visual rendering of the combination of the image data and the gesture data rendered by the agent's and the principal's UI may not need be identical. Similarly, views 1020 and 1040 shows the corresponding visual combinations of image data and zoom cue data for the principal's (1020) and agent's (1040) UI for a zoom out cue data, generated by the principal performing a reverse-pinch gesture. Also note the correspondence between the region of the image data and the gesture data generated by the principal. The visual representation of the combination of the image data and the gesture data conserves the correspondence.

At block 760, pan cue data may be captured. When visually rendered on a user's display device, the pan cue data may provide a visual cue for the user to pan the image sensor they are employing to capture image data. At block 762, tile cue data may be captured. When visually rendered on a user's display device, the tilt cue data may provide a visual cue for the user to tilt the image sensor they are employing to capture image data.

At block 764, additional data may be captured. Additional data captured at block 764 may include, but is not otherwise limited to additional gesture data. Such additional gesture data may include, but are not otherwise limited to gestures that generate icons or text with predefined information. Such gesture data may include gesture to textual information data. Furthermore, additional data may include locational, positional, attitudinal, or orientation data.

Figure 11A:
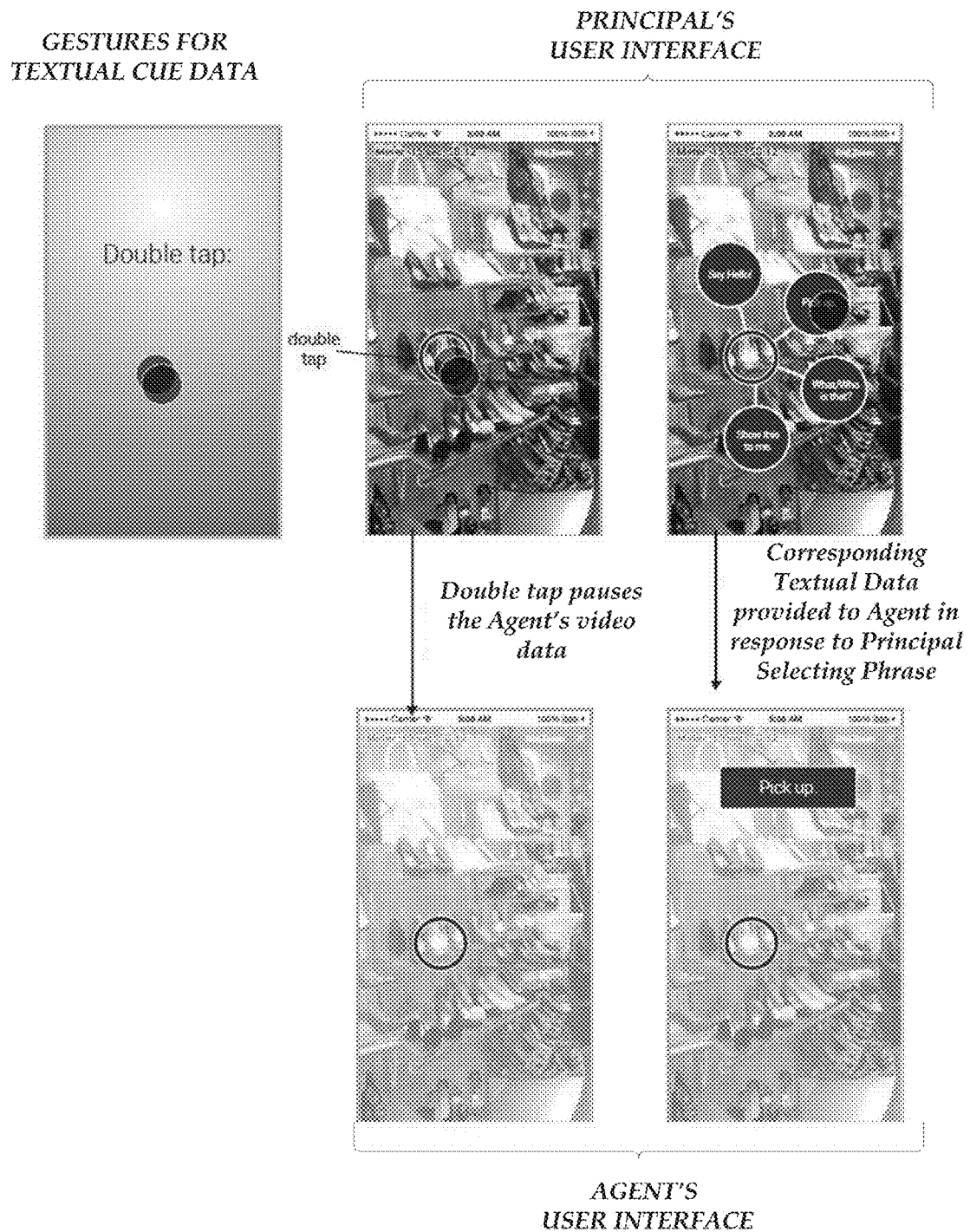
FIG. 11A shows additional embodiments of gesture data.

FIG. 11A shows additional embodiments of gesture data. As, as shown in FIG. 11A, a principal may double tap their touch-sensitive display device to generate a menu that includes a plurality of selectable options for icons that include textual messages. The principal may select one or more of the selectable options. A visual representation of the selected option may be provided to the agent via a visual representation of a blend or overlaying of the option on the image data, as viewed by the agent. The video image data may be paused.

Figure 11C:
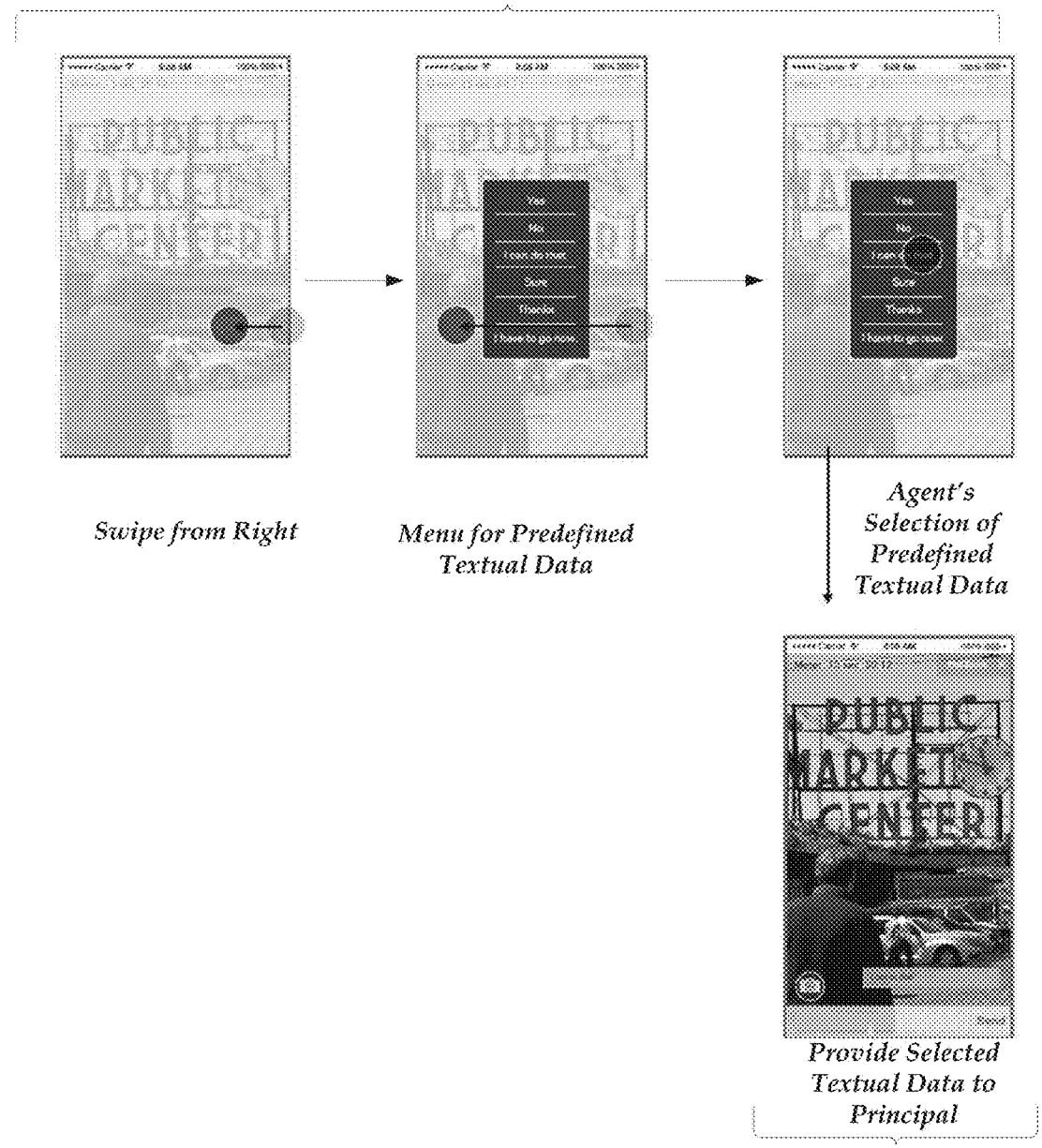
FIG. 11C shows additional embodiments of gesture to textual data.

FIG. 11B shows embodiments of gesture to textual data. As shown in FIG. 11B, a two finger tap gesture performed by the agent may provide textual data, such as "No." Similarly, a vertical swipe down may generate other textual data, such as "Yes." Accordingly, in various embodiments, the agent and principal may communicate back and forth with gesture to textual data, in real time, or at least near real-time. FIG. 11C shows additional embodiments of ges-ture to textual data. Similarly to FIGS. 11A and 11B, FIG. 11C shows that in at least some embodiments, a swipe from the right gesture may generate another menu that includes a plurality of selectable options for icons that include textual messages. The agent may select one or more of the selectable options. A visual representation of the selected option may be provided to the principal via a visual representation of a blend or overlaying of the option on the image data, as viewed by the principal. Such gesture to textual data functionalities enable users to communicate via at least predefined selectable textual data. In at least one embodiment, the textual data may be automatically translated and/or localized.

Additional data at block 764 may include sensor data. For instance, at least one of the principal or the agent may employ one or more sensors, such as but not limited to may include accelerometers, temperature sensors, barometric sensors, light sensors, biometric sensors, such as heartrate monitors, and the like. At least a portion of these sensors may be wearable. Such wearable devices may include but are not otherwise limited to a pedometer, a smartwatch, headwear, glasses, and the like. Data generated and/or captured by these sensors may be captured at block 764 and included in the CS data. Thus, each of the principal and agent may be provided sensor data generated and/or captured by the other party's sensors in real time, or near real-time.

At block 766, augmented reality (AR) data may be captured. The AR data may be included in the CS data stream. Such AR data may be overlaid and/or blended with the image data to identify specific POIs or particular items within the field of view. AR data may be used to indicate particular information, such a cost of an item, distance to another location, or the like. At least a portion of the AR data may be captures and/or generated by one or more of the sensors, such as wearable sensors. Process 700 may terminate and/or return a calling process.

In at least one or more of the various embodiments, a video protocol is employed for communicating video data and gesture data over the communication session. The video protocol includes a primary channel for communicating data and a secondary or sub-channel for communicating network chat messages between a Principal and an Agent. However, the sub-channel is repurposed to also communicate both a gesture protocol for gesture data and a session protocol for session control data between the Agent and the Principal. Text messages may still be communicated and displayed between the Principal and the Agent. However, additional gesture data and session control data in the JSON format is communicated, but not displayed, by the gesture protocol and the session protocol between the Principal and the Agent. Instead, the gesture data is employed to generate the cues presented on the computing devices of the Agent and the Principal. And the communication session between the Agent and the Principal is controlled by the session control data.

One embodiment of a gesture protocol employed to communicate the gesture data in the JSON format provides for communicating fixed and dynamic graphical/visual messaging between two users, using only single or two-finger "gesture" actions. Such gesture data includes, but is not limited to:

1. SWIPE1: Single-finger contiguous swipe, to render a directional instruction ("go this direction", "turn/rotate to the right", etc.). See FIG. 9A;
2. STOP: Two-finger tap, to render a "Stop" action to the user (FIG. 9B);

3. ZOOM-IN/ZOOM-OUT: Two-finger pinch in/out, to render a "Zoom In" or "Zoom Out" directional instruction (FIG. 10);
4. MENU1: Single-finger double-tap to invoke a context menu of extended directional instructions (FIG. 11A);
5. RESPONSE1: Single and Two-finger swipe actions for a specific user role, to act as dedicated response actions, which can be rendered visually or as pre-defined chat messages sent to the other user (FIG. 11B); and
6. RESPONSE2: Single-finger swipe action for a specific user role to invoke a context menu of extended response actions (FIG. 11C).

These gesture actions are abstracted into gesture data via a coded transmission protocol. The transmission of the captured gesture actions is achieved through coding a gesture type with a corresponding coded gesture protocol, which is received and translated by the receiving user (Agent or Principal), that then renders a presentation of the relevant gesture action. The assembled gesture protocol message is contained in a special "chat message", which signifies that the contained string content is to be decoded for gesture action rendering, rather than being pushed into the user's text chat interface. In this manner, an existing, stateless, sub-channel network chat communication protocol can be repurposed to contain both direct text chat content between users and carry the gesture protocol and session protocol. Some aspects of the gesture protocol consists of the following:

1. Chat message Prefix: "@@GX:@@"—This indicates that this is a special chat message, to be decoded into a gesture action.
2. JSON Data, containing elements required to identify the type and x,y coordinates of the gesture action:
   a. SWIPE1: "{"SWIPE1": {{"x1":x,"y1":y}, {"x2":x, "y2":y} . . . {"xn":x,"yn":y}}}"—Where the x,y pixel coordinates of the contiguous swipe area is identified and rendered in the receiving user's UI in a manner of visually "connecting the dots".
   b. STOP: "{"STOP"}—Indicate a single visual command to render a stop graphic
   c. ZOOM-IN: "{"ZOOM-IN":{{"x":x,"y":y}}}"—Identify the visual action to be rendered graphically, centered on the provided x,y pixel coordinates.
   d. ZOOM-OUT: "{"ZOOM-OUT":{{"x":x,"y": y}}}"—Identify the visual action to be rendered graphically, centered on the provided x,y pixel coordinates.
   e. MENU1: "{"MENU1": {"command":"xxxxxx"}, {"x":x,"y":y}}}"—Identify the visual command to be rendered graphically, centered on the provided x,y pixel coordinates.
   f. RESPONSE1 and RESPONSE2:
      "{"RESPONSE1": {"type":"chat","msg":"Yes"}}"
      OR
      "{"RESPONSE1":{"type":"pos","msg":"Yes"}, {"x":x,"y":y}}"—Indicate a single visual command to render chat or in-screen message at the given pixel coordinates.

In regard to x,y pixel coordinates data, the x, y pixel coordinates are evaluated for potential adjustment/scaling when rendering on different device types. As such, a communication session begins with an exchange of each user's computing device display resolution and dimensions, which are then factored into the received x,y pixel coordinates.

In regard to the session protocol for communicating live video streaming session management control messages between the two users (Agent and Principal), such messaging includes, but is not limited to:
1. User joined Channel;
2. User exited channel;
3. User resumed channel;
4. User ended session;
5. User disconnected;
6. User video published;
7. User video subscribed;
8. User video active; and
9. Meter synchronization.

The user's actions are abstracted via a coded session protocol. Capture of gesture actions is achieved through coding each specific state message type with an associated coded protocol, which is received and translated by the receiving user, to then respond to the corresponding action. The assembled protocol message is contained in a special "chat message", which signifies that the contained string content is to be decoded for session control data, rather than being pushed into the user's text chat interface. In this manner, the existing, stateless, network chat communication protocol can contain both direct text chat content between users and carry the session control protocol. Session control messages may include a local date/time value from the local computing device to ensure that the most recent control messages are processed. Typically, the session control messages are not required to be encoded themselves, because the network chat communication itself is typically encoded. The session control protocol may consist of at least some of the following:

1. Chat message Prefix: "@@SC:@@". This prefix may be employed to indicate that this is a special chat message to be separately decoded as a session control action.
2. The JSON data contains the elements employed to identify the type and context of the session control action as follows:
   a. User joined channel:
      "{"MSG":"JC","LANGUAGE":"en","USER-NAME":"John_Doe","ID":"nnnnnn","TS": "YYYYMMDDHHMMSSmm"}
   b. User exited channel:
      "{"MSG":"EC","TS":"YYYYMMDDH-HMMSSmm"}
   c. User resumed channel:
      "{"MSG": "RC","TS":"YYYYMMDDH-HMMSSmm"}
   d. User ended session:
      "{"MSG": "ES","TS":"YYYYMMDDH-HMMSSmm"}
   e. User disconnected:
      "{"MSG":"UD","TS":"YYYYMMDDH-HMMSSmm"}
   f. User video published:
      "{"MSG": "VP","TS":"YYYYMMDDH-HMMSSmm"}
   g. User video subscribed:
      "{"MSG":"VS","TS":"YYYYMMDDH-HMMSSmm"}
   h. User video active:
      "{"MSG": "VA","TS":"YYYYMMDDH-HMMSSmm"}
   i. Meter synchronization:
      "{"MSG":"MS","M":"NN:nn","TS":"YYYYM-MDDHHMMSSmm"}

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

All of the embodiments and methods disclosed and claimed herein can be made and executed without undue experimentation in light of the present disclosure. While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed as new and desired to be protected by Letters Patent of the United States is:

1. A method for providing a real time image capture service between two users over a network, wherein a computing device for each user and a network platform includes one or more processors that execute instructions to perform actions, comprising:
   employing an engine instantiated for the network platform to perform actions, including:
      receiving a request from a principal user to perform the real time image capture service at a physical location; wherein the network platform forwards the request to a selected agent user that is currently available to perform the request; and
      establishing a real time communication session between the principal user and the selected agent user, wherein the communication session includes a streaming service that provides a primary channel for communicating one or more of images or video and a chat sub-channel for communicating text messages between the principal user and the selected agent user; and
   employing a principal engine for the principal user to perform actions, comprising:
      displaying image data in real time that is provided by the selected agent user over the primary channel; and
      transforming physical gestures of the principal user associated with a display of the real time image data into cues that direct one or more actions of the selected agent user, wherein these cues are coded into gesture data that is based on a gesture protocol, and wherein the gesture data is communicated over the chat message sub-channel to the agent user; and
   employing an agent engine for the agent user to perform actions, comprising:
      receiving the gesture data over the chat message sub-channel, wherein the gesture data is non-displayed to the agent user; and
      employing the gesture protocol to transform the received gesture data into one or more visual representations of each cue or text, wherein the one or more visual representations are composited on the image data currently being captured and displayed to the agent user, wherein the one or more visual representations indicate actions requested by the principal user to be performed by the agent user.

2. The method of claim 1, wherein the network platform engine performs further actions comprising coding session control commands into session control data that is based on a session control protocol, wherein the session control data is communicated over the chat message sub-channel to one or both of the agent user or the principal user.

3. The method of claim 1, wherein the principal engine performs further actions, comprising enabling the principal user to select one of a plurality of agent users that are currently available based on one or more of a first available agent user, a history of providing the image capture service by one or more of the plurality of agent users, one or more credentials of the plurality of agent users, one or more profiles of the plurality of agent users, one or more rankings of the plurality of agent users, a cost of one or more of the plurality of agent users to provide the image capture service, or one or more reviews of the plurality of agent users.

4. The method of claim 1, wherein the principal engine performs further actions comprising receiving another request from the principal user for the image capture service at the same physical location, wherein the network platform forwards the other request to another selected agent user that is currently available to perform the request.

5. The method of claim 1, wherein the network platform engine performs further actions, comprising when the communication session is disconnected before completion of the request, automatically buffering gesture data, session control data and image data provided by the principal user and the agent user until the communication session is re-connected, wherein the buffered data is played back over the reconnected communication session to the principal user and agent user.

6. The method of claim 1, wherein the principal engine performs further actions comprising selecting, for the image capture service, one of more of a minimum resolution, a preferred resolution, or a maximum resolution.

7. The method of claim 1, wherein the principal engine performs further actions comprising enabling the principal user to provide one or more of a credit, an attribution, a financial payment or a donation to the selected agent user.

8. The method of claim 1, wherein the network platform engine performs further actions, comprising bi-directionally communicating audio communication between the principal user and the agent user over the communication session.

9. A system for providing a real time image capture service between two users over a network, wherein a computing device for each user and a network platform includes one or more processors that execute instructions to perform actions, comprising:
- a network platform computer that including:
  - instructions; and
  - one or more processors that execute the instructions to instantiate an engine that performs actions, including:
    - receiving a request from a principal user to perform the real time image capture service at a physical location; wherein the network platform forwards the request to a selected agent user that is currently available to perform the request; and
    - establishing a real time communication session between the principal user and the selected agent user, wherein the communication session includes a streaming service that provides a primary channel for communicating one or more of images or video and a chat sub-channel for communicating text messages between the principal user and the selected agent user; and
- a computing device for the principal user, comprising:
  - instructions; and
  - one or more processors that execute the instructions to instantiate a principal engine that performs actions, including:
    - displaying image data in real time that is provided by the selected agent user over the primary channel; and
    - transforming physical gestures of the principal user associated with a display of the real time image data into cues that direct one or more actions of the selected agent user, wherein these cues are coded into gesture data that is based on a gesture protocol, and wherein the gesture data is communicated over the chat message sub-channel to the agent user; and
- a computing device for the agent user, comprising:
  - instructions; and
  - one or more processors that execute the instructions to instantiate an agent engine that performs actions, including:
    - receiving the gesture data over the chat message sub-channel, wherein the gesture data is non-displayed to the agent user; and
    - employing the gesture protocol to transform the received gesture data into one or more visual representations of each cue or text, wherein the one or more visual representations are composited on the image data currently being captured and displayed to the agent user, wherein the one or more visual representations indicate actions requested by the principal user to be performed by the agent user.

10. The system of claim 9, wherein the network platform engine performs further actions comprising coding session control commands into session control data that is based on a session control protocol, wherein the session control data is communicated over the chat message sub-channel to one or both of the agent user or the principal user.

11. The system of claim 9, wherein the principal engine performs further actions comprising enabling the principal user to select one of a plurality of agent users that are currently available based on one or more of a first available agent user, a history of providing the image capture service by one or more of the plurality of agent users, one or more credentials of the plurality of agent users, one or more profiles of the plurality of agent users, one or more rankings of the plurality of agent users, a cost of one or more of the plurality of agent users to provide the image capture service, or one or more reviews of the plurality of agent users.

12. The system of claim 9, wherein the principal engine performs further actions comprising receiving another request from the principal user for the image capture service at the same physical location, wherein the network platform forwards the other request to another selected agent user that is currently available to perform the request.

13. The system of claim 9, wherein the network platform engine performs further actions, comprising when the communication session is disconnected before completion of the request, automatically buffering gesture data, session control data and image data provided by the principal user and the agent user until the communication session is re-connected, wherein the buffered data is played back over the reconnected communication session to the principal user and agent user.

14. The system of claim 9, wherein the principal engine performs further actions comprising selecting, for the image capture service, one of more of a minimum resolution, a preferred resolution, or a maximum resolution.

15. The system of claim 9, wherein the principal engine performs further actions comprising enabling the principal user to provide one or more of a credit, an attribution, a financial payment or a donation to the selected agent user.

16. The system of claim 9, wherein the network platform engine performs further actions, comprising bi-directionally communicating audio communication between the principal user and the agent user over the communication session.

17. A non-transitory computer readable media that includes instructions for providing a real time image capture service between two users over a network, wherein a computing device for each user and a network platform includes one or more processors that execute the instructions to perform actions, comprising:
- employing an engine instantiated for the network platform to perform actions, including:
  - receiving a request from a principal user to perform the real time image capture service at a physical location; wherein the network platform forwards the request to a selected agent user that is currently available to perform the request; and
  - establishing a real time communication session between the principal user and the selected agent user, wherein the communication session includes a streaming service that provides a primary channel for communicating one or more of images or video and a chat sub-channel for communicating text messages between the principal user and the selected agent user; and
- employing a principal engine for the principal user to perform actions, comprising:
  - displaying image data in real time that is provided by the selected agent user over the primary channel; and
  - transforming physical gestures of the principal user associated with a display of the real time image data into cues that direct one or more actions of the selected agent user, wherein these cues are coded into gesture data that is based on a gesture protocol, and wherein the gesture data is communicated over the chat message sub-channel to the agent user; and employing an agent engine for the agent user to perform actions, comprising:

receiving the gesture data over the chat message sub-channel, wherein the gesture data is non-displayed to the agent user; and employing the gesture protocol to transform the received gesture data into one or more visual representations of each cue or text, wherein the one or more visual representations are composited on the image data currently being captured and displayed to the agent user, wherein the one or more visual representations indicate actions requested by the principal user to be performed by the agent user.

18. The non-transitory computer readable media of claim 17, wherein the network platform engine performs further actions comprising coding session control commands into session control data that is based on a session control protocol, wherein the session control data is communicated over the chat message sub-channel to one or both of the agent user or the principal user.

19. The non-transitory computer readable media of claim 17, wherein the principal engine performs further actions, comprising enabling the principal user to select one of a plurality of agent users that are currently available based on one or more of a first available agent user, a history of providing the image capture service by one or more of the plurality of agent users, one or more credentials of the plurality of agent users, one or more profiles of the plurality of agent users, one or more rankings of the plurality of agent users, a cost of one or more of the plurality of agent users to provide the image capture service, or one or more reviews of the plurality of agent users.

20. The non-transitory computer readable media of claim 17, wherein the principal engine performs further actions comprising receiving another request from the principal user for the image capture service at the same physical location, wherein the network platform forwards the other request to another selected agent user that is currently available to perform the request.

21. The non-transitory computer readable media of claim 17, wherein the network platform engine performs further actions, comprising when the communication session is disconnected before completion of the request, automatically buffering gesture data, session control data and image data provided by the principal user and the agent user until the communication session is re-connected, wherein the buffered data is played back over the reconnected communication session to the principal user and agent user.

22. The non-transitory computer readable media of claim 17, wherein the principal engine performs further actions comprising selecting, for the image capture service, one of more of a minimum resolution, a preferred resolution, or a maximum resolution.

23. The non-transitory computer readable media of claim 17, wherein the principal engine performs further actions comprising enabling the principal user to provide one or more of a credit, an attribution, a financial payment or a donation to the selected agent user.

24. The non-transitory computer readable media of claim 17, wherein the network platform engine performs further actions, comprising bi-directionally communicating audio communication between the principal user and the agent user over the communication session.

\* \* \* \* \*

UNITED STATES PATENT AND TRADEMARK OFFICE
CERTIFICATE OF CORRECTION

PATENT NO.         : 9,674,290 B1
APPLICATION NO.    : 15/365884
DATED              : June 6, 2017
INVENTOR(S)        : Rincon et al.

Page 1 of 4

It is certified that error appears in the above-identified patent and that said Letters Patent is hereby corrected as shown below:

On the Title Page

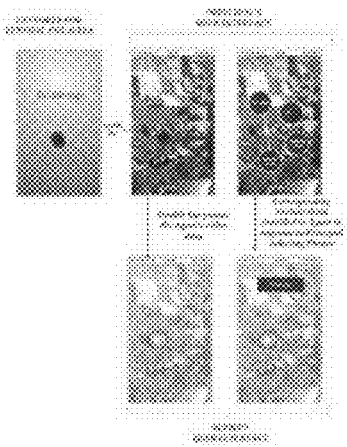

In the Figure, delete " " and insert

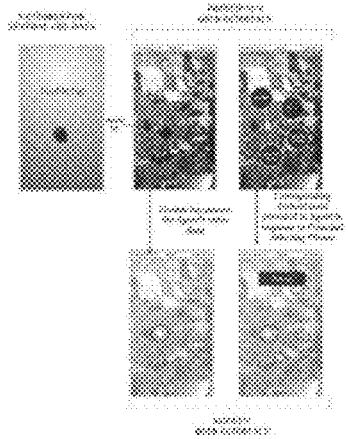

-- 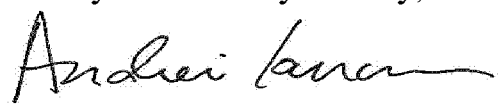 --, therefor.

Signed and Sealed this
Twenty-second Day of May, 2018

Andrei Iancu
*Director of the United States Patent and Trademark Office*

CERTIFICATE OF CORRECTION (continued)
U.S. Pat. No. 9,674,290 B1

In the Drawings

In Fig. 2, Sheet 2 of 18, delete "COMPTER" and insert -- COMPUTER --, therefor.

In Fig. 4, Sheet 4 of 18, for Step "408", in Line 4, delete "FIG" and insert -- FIG. --, therefor.

In Fig. 6, Sheet 6 of 18, for Step "606", in Line 4, delete "FIG." and insert -- FIGS. --, therefor.

In Fig. 7A, Sheet 7 of 18, for Step "706", in Line 3, delete "FIG" and insert -- FIG. --, therefor.

In the Specification

In Column 1, Line 7, delete "files" and insert -- filed --, therefor.

In Column 1, Line 7, delete "Application U.S." and insert -- Application --, therefor.

In Column 1, Line 12, delete "Application U.S." and insert -- Application --, therefor.

In Column 1, Line 17, delete "Application U.S." and insert -- Application --, therefor.

In Column 1, Line 52, delete "embodiment;" and insert -- embodiments; --, therefor.

In Column 1, Line 56, delete "embodiment;" and insert -- embodiments; --, therefor.

In Column 1, Line 60, delete "embodiment;" and insert -- embodiments; --, therefor.

In Column 1, Line 64, delete "embodiment;" and insert -- embodiments; --, therefor.

In Column 3, Line 25, delete "a networked" and insert -- networked --, therefor.

In Column 3, Line 64, delete "a augmented" and insert -- an augmented --, therefor.

In Column 4, Line 19, delete "includes in a" and insert -- included in a --, therefor.

In Column 5, Line 21, delete "agents" and insert -- agent's --, therefor.

In Column 6, Lines 5-6, delete "a image" and insert -- an image --, therefor.

In Column 9, Lines 11-12, delete "CSSC 110, ATPSC 120, CSSC 130," and insert -- CSSC 110, ATPSC 120, CSSC 110 --, therefor.

In Column 9, Line 14, delete "pagent" and insert -- agent --, therefor.

In Column 10, Lines 36-37, delete "computers 102-105," and insert -- computers 102-105, agent computers 112-118 --, therefor.

CERTIFICATE OF CORRECTION (continued)
U.S. Pat. No. 9,674,290 B1

In Column 10, Line 37, delete "computers 112," and insert -- CSSC 110, --, therefor.

In Column 11, Line 37, delete "Enhanced Data GSM Environment" and insert -- Enhanced Data rates for GSM Evolution --, therefor.

In Column 11, Line 45, delete "Orthogonal" and insert -- orthogonal --, therefor.

In Column 11, Line 52, delete "Open Tok" and insert -- OpenTok --, therefor.

In Column 12, Line 38, delete "it's own" and insert -- its own --, therefor.

In Column 12, Line 39, delete "it's own" and insert -- its own --, therefor.

In Column 12, Line 56, delete "SIP/RTP, GPRS" and insert -- SIP/RTP, --, therefor.

In Column 13, Line 16, delete "keypad 254," and insert -- keypad 252, --, therefor.

In Column 13, Line 57, delete "computers 102-118" and insert -- computers 102-108 --, therefor.

In Column 15, Line 14, delete "CS platform 110" and insert -- CS platform 140 --, therefor.

In Column 16, Line 40, delete "GPS 338," and insert -- GPS 358, --, therefor.

In Column 16, Line 55, delete "it's own" and insert -- its own --, therefor.

In Column 16, Line 56, delete "it's own" and insert -- its own --, therefor.

In Column 16, Line 67, delete "with a" and insert -- with an --, therefor.

In Column 17, Line 3, delete "unit 320." and insert -- unit 330. --, therefor.

In Column 17, Line 54, delete "system" and insert -- system. --, therefor.

In Column 18, Line 1, delete "CS server 324" and insert -- CS engine 324 --, therefor.

In Column 29, Line 49, delete "principle" and insert -- principal --, therefor.

In Column 31, Line 4, delete "embodiment." and insert -- embodiments. --, therefor.

In Column 31, Line 30, delete "both," and insert -- both. --, therefor.

In Column 35, Line 24, delete "embodiment." and insert -- embodiments. --, therefor.

In Column 37, Line 51, delete "As, as shown" and insert -- As shown --, therefor.

In Column 39, Line 41, delete "graphic" and insert -- graphic. --, therefor.

CERTIFICATE OF CORRECTION (continued)
U.S. Pat. No. 9,674,290 B1

In Column 39, Line 50, delete "{"x":x, "y":y}}"" and insert -- {"x":x, "y":y}}" --, therefor.

In Column 40, Line 3, delete "Channel;"" and insert -- channel; --, therefor.

In Column 40, Line 41, delete ""YYYYMMDDHHMMSSmm"}" and insert -- "YYYYMMDDHHMMSSmm"}" --, therefor.

In Column 40, Line 44, delete "HMMSSmm"}" and insert -- "HMMSSmm"}" --, therefor.

In Column 40, Line 47, delete "HMMSSmm"}" and insert -- "HMMSSmm"}" --, therefor.

In Column 40, Line 50, delete "HMMSSmm"}" and insert -- "HMMSSmm"}" --, therefor.

In Column 40, Line 53, delete "HMMSSmm"}" and insert -- "HMMSSmm"}" --, therefor.

In Column 40, Line 56, delete "HMMSSmm"}" and insert -- "HMMSSmm"}" --, therefor.

In Column 40, Line 59, delete "HMMSSmm"}" and insert -- "HMMSSmm"}" --, therefor.

In Column 40, Line 62, delete "HMMSSmm"}" and insert -- "HMMSSmm"}" --, therefor.

In Column 40, Line 65, delete "MDDHHMMSSmm"}" and insert -- "MDDHHMMSSmm"}" --, therefor.

In the Claims

In Column 42, Line 62, in Claim 6, delete "one of more" and insert -- one or more --, therefor.

In Column 43, Line 10, in Claim 9, delete "computer that" and insert -- computer, --, therefor.

In Column 44, Line 29, in Claim 14, delete "one of more" and insert -- one or more --, therefor.

In Column 46, Lines 20-21, in Claim 22, delete "one of more" and insert -- one or more --, therefor.